(12) United States Patent
Ito et al.

(10) Patent No.: US 6,529,522 B1
(45) Date of Patent: *Mar. 4, 2003

(54) COMMUNICATION APPARATUS WITH DIGITAL INTERFACE

(75) Inventors: Masamichi Ito, Machida; Koji Takahashi, Chigasaki; Hiroki Yamashita, Yokohoma, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,122

(22) Filed: Mar. 12, 1998

(30) Foreign Application Priority Data

Mar. 12, 1997 (JP) .............................................. 9-057606
Mar. 4, 1998 (JP) ........................................... 10-051954

(51) Int. Cl.<sup>7</sup> .............................................. H04L 12/46
(52) U.S. Cl. ........................ 370/466; 370/401; 370/467
(58) Field of Search ................................ 370/401, 402, 370/419, 420, 421, 463, 466, 467, 468, 485, 486, 487, 489, 490, 545, 453; 709/249

(56) References Cited

U.S. PATENT DOCUMENTS 5,563,886 A * 10/1996 Kawamura et al. ......... 370/466
6,157,650 A * 12/2000 Okuyama et al. ........... 370/401

FOREIGN PATENT DOCUMENTS

| EP | 0254565 | 1/1988 |
| EP | 0537061 | 4/1993 |
| EP | 0619662 | 10/1994 |

OTHER PUBLICATIONS

IEEE Std 1394–1995, "IEEE Standard for a High Performance Serial Bus", The Institute of Electrical And Electronics Engineers, Inc., IEEE Computer Society, Aug. 30, 1996, p. 1–172 (complete copy of standard).

* cited by examiner

Primary Examiner—Wellington Chin
Assistant Examiner—Frank Duong
(74) Attorney, Agent, or Firm—Fitzpatrick, Cella, Harper & Scinto

(57) ABSTRACT

The communication apparatus is equipped with a first communication interface for executing communication based on a first communication method, and a second communication interface for executing communication based on a second communication method different from the first communication method. The communication apparatus sets ID information for identifying device executing communication by the first communication method, for device which executes communication with the second communication interface.

In this manner plural device supporting different communication methods can be recognized as device belonging to a same communication system.

16 Claims, 12 Drawing Sheets

|  | NORMAL OPERATION MODE | DIRECT PRINT MODE | NETWORK MODE |
|---|---|---|---|
| 1394 INTERFACE A (311) | VALID | INVALID | VALID |
| 1394 INTERFACE B (310) | INVALID | INVALID | VALID |
| WIRELESS INTERFACE (309) | VALID | VALID | VALID |

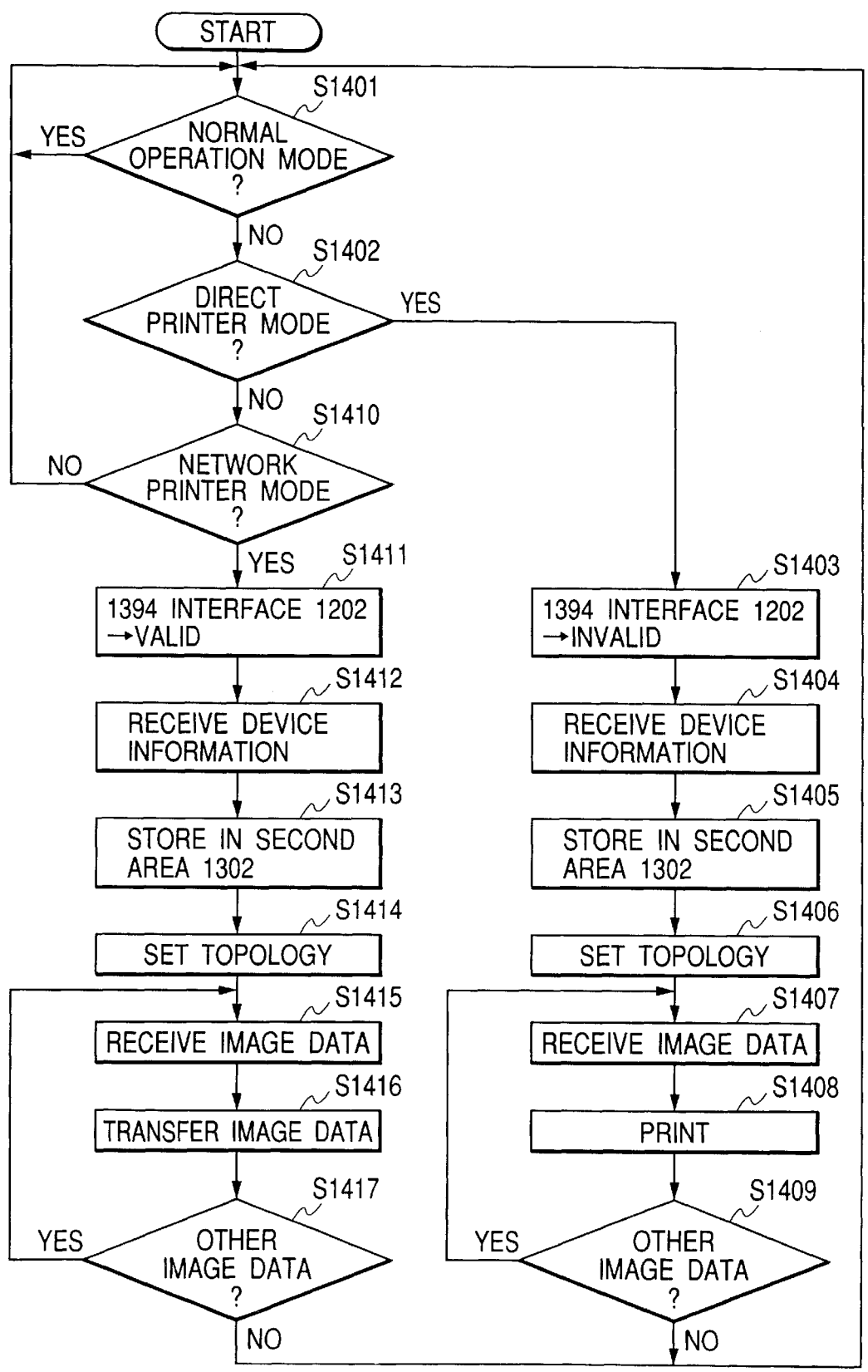

COMMUNICATION APPARATUS WITH DIGITAL INTERFACE

BACKGROUND OF THE INVENTION

1. Field of the Invention

The present invention relates to a data communication apparatus, a method and a system therefor, and a program for data communication process stored in a memory medium, and more particularly to a technology for causing plural devices corresponding to communication methods of different formats to be recognized as a single communication system.

2. Related Background Art

Recently there is actively investigated, in constructing a communication system with electronic device such as a personal computer, a printer, a hard disk, a digital camera, a digital video camera etc., the connection of such device through digital interfaces corresponding to a communication method of a common format, thereby realizing high-speed data communication.

Among the next-generation high speed digital interfaces developed from such standpoint, there is known a digital interface based on the IEEE 1394-1995 high performance serial bus standard (hereinafter called IEEE 1394 standard). The IEEE 1394 standard defines two transfer methods, namely the isochronous transfer mode and the asynchronous transfer mode. The isochronous transfer mode ensures the transmission and reception of a predetermined amount of data in each communication cycle (125 µs) and is executive for the real-time transfer of image signal or voice signal, while the asynchronous transfer mode executes transmission and reception asynchronously with the communication cycle and is executive for transmitting and receiving the control commands and the file data whenever necessary. In each communication cycle time, the asynchronous mode has a lower priority in comparison with the isochronous mode.

Also in the IEEE 1394 standard, the configuration of connection of the communication system can be automatically recognized. More specifically, in response to a change in the configuration of connection, resulting from the addition of a new device, the deletion of a connected device, the on/off operation of power supply of a connected device, there is automatically executed the recognition of the configuration of connection of the newly constructed system and the setting of ID information for the device constituting such system.

Furthermore, the IEEE 1394 standard is provided with a function of relaying the data transmitted from each device. Thus the communication packet, transmitted from each device in the isochronous transfer mode or the asynchronous transfer mode, is transferred, by such relaying function, to all the device on the communication system.

The details of the IEEE 1394 standard are described in the "IEEE Standard for a High Performance Serial Bus" published by Institute of Electrical and Electronics, Inc. on Aug. 30, 1996.

FIG. 1 illustrates an example of a serial-bus type communication system constituted by plural electronic device equipped with the digital interfaces based on the IEEE 1394 standard (hereinafter written as 1394 interface). In the example shown in FIG. 1, the electronic device are connected in a tree shape configuration.

In FIG. 1, there are shown a personal computer 103, a portable digital VTR 102 such as a digital camcorder, a desk-top VTR 103 capable, for example, of dubbing the digital image data of the camcorder 102, and communication cables 104 connecting the 1394 interfaces provided on the electronic device.

In case of connecting a portable device such as the digital camcorder 102 to such communication system, it has been necessary to make the connection with the communication cable 104 as shown in FIG. 1. However the connection of the portable device with the communication cable has been associated with drawbacks that the connecting operation is cumbersome and that the freedom of connection is lost, depending on the length and the shape of such communication cable. In particular, in the portable device in which the compactness is an essential factor, there is encountered a difficulty of providing the connector for the communication cable in a limited space.

In consideration of such inconvenience of connection with the communication cable, it is conceivable to connect the portable device by a wireless system to the above-mentioned communication system, by a wireless communication method based for example on the IrDA (Infrared Data Association) standard. In such case, however, such portable device, executing communication according to the communication method of a standard different from the IEEE 1394 standard, can communicate with the device capable of accommodating such communication method but is incapable of communicating with the entire communication system mentioned above. Also the communication system capable, as explained above, of automatically recognizing the connection of a new device cannot recognize such portable device which utilizes the communication method different from the IEEE 1394 standard. Therefore, in order to execute communication between such portable device and the device constituting the above-mentioned communication system, each device has to be provided with a communication interface corresponding to the communication method same as that employed in the portable device.

SUMMARY OF THE INVENTION

An object of the present invention is to solve the above-described drawbacks.

Another object of the present invention is, in a data communication apparatus, to cause a device corresponding to the communication method of a standard different for example from the IEEE 1394 standard on which the communication system is based, to be recognized as a component of such communication system. Also it is to cause a function of the device corresponding to the communication method of a standard different from that of the communication system to be recognized as a function provided in the device constituting such communication system.

As a preferred embodiment of the present invention for such objects, there is disclosed a data communication apparatus comprising:

a) first communication means for executing communication based on a first communication method;

b) second communication means for executing communication based on a second communication method different from the first communication method; and c) setting means for setting ID information for identifying a device executing communication based on the first communication method, on a device executing communication with the second communication means.

As another preferred embodiment of the present invention for such objects, there is disclosed a data communication apparatus connectable to a communication system including plural devices corresponding to a common communication method, comprising:
  a) a communication interface corresponding to a predetermined communication method, which is different from the common communication method; and
  b) means for causing each of the devices of the communication system to recognize a device capable of communication with the communication interface as one of the devices of the communication system.

As still another preferred embodiment of the present invention for such objects, there is disclosed a data communication apparatus comprising:
  a) first communication means corresponding to a first communication method;
  b) second communication means corresponding to a second communication method different from the first communication method; and
  c) setting means for resetting information to be used by the first communication means, relating to the data communication apparatus according to a connection status of the second communication means.

As still another preferred embodiment of the present invention for such objects, there is disclosed a data communication apparatus connectable to a communication system including plural devices corresponding to a common communication method, comprising:
  a) a communication interface corresponding to a predetermined communication method, which is different from the common communication method; and
  b) means for causing each of the device constituting the communication system to recognize a function of a device capable of communication with the communication interface as a function of the data communication apparatus.

Still another object of the present invention is, in a data communication method, to cause a device corresponding to the communication method of a standard different for example from the IEEE 1394 standard on which a communication system is based, to be recognized as a component of such communication system. Also it is to cause a function of the device corresponding to the communication method of a standard different from that of the communication system to be recognized as a function provided in the device constituting such communication system.

As a preferred embodiment of the present invention for such object, there is disclosed a data communication method adaptable in an apparatus executing communication based on a first communication method and communication based on a second communication method different from the first communication method, comprising a step of:
  setting ID information for identifying a device executing communication based on the first communication method, on a device executing communication based on the second communication method.

As another preferred embodiment of the present invention for such object, there is disclosed a data communication method adaptable in an apparatus provided with a first communication interface corresponding to a first communication method and a second communication interface corresponding to a second communication method different from the first communication method, comprising a step of:
  resetting information to be used by the first communication interface, relating to the apparatus and according to the connection status of the second communication interface.

As still another preferred embodiment of the present invention for such object, there is disclosed a data communication method adaptable in a communication system including plural devices corresponding to a common communication method, comprising steps of:
  a) executing communication with a predetermined device, based on a communication method different from the common communication method; and
  b) causing each of the device of the communication system to recognize the predetermined device as one of the device of the communication system.

As still another preferred embodiment of the present invention for such object, there is disclosed a data communication method adaptable in a communication system including plural devices corresponding to a common communication method, comprising steps of:
  a) executing communication with a predetermined device, based on a communication method different from the common communication method; and
  b) causing each of the device constituting the communication system to recognize a function of the predetermined device as a function of the device executing communication based on the different communication method.

Still another object of the present invention is, in a data communication system, to cause a device corresponding to the communication method of a standard different for example from the IEEE 1394 standard on which a communication system is based, to be recognized as a component of such communication system. Also it is to cause a function of the device corresponding to the communication method of a standard different from that of the communication system to be recognized as a function provided in the device constituting such communication system.

As a preferred embodiment of the present invention for such object, there is disclosed a data communication system comprising:
  a) a first communication apparatus corresponding to a first communication method; and
  b) a second communication apparatus corresponding to a second communication method different from the first communication method;
  wherein ID information for identifying a device executing communication based on the first communication method is set for the second communication apparatus.

As another preferred embodiment of the present invention for such object, there is disclosed a data communication system comprising:
  a) a first communication apparatus corresponding to a first communication method; and
  b) a second communication apparatus corresponding to a second communication method different from the first communication method;
  wherein information relating to the first data communication apparatus is reset according to a connection status of the first communication apparatus and the second communication means.

As still another preferred embodiment of the present invention for such object, there is disclosed a data communication system includes plural devices corresponding to a common communication method, comprising:
  a) a communication apparatus corresponding to a predetermined communication method, which is different from the common communication method; and
  b) a device for causing each of the communication apparatus constituting the communication system to recognize the communication apparatus as one of the communication apparatus constituting the communication system.

As still another preferred embodiment of the present invention for such object, there is disclosed a data communication system includes plural devices corresponding to a common communication method, comprising:

a) a communication apparatus corresponding to a predetermined communication method, which is different from the common communication method; and b) a device for causing each of the device constituting the communication system to recognize a function provided in the communication apparatus as a function of the device capable of communication with the communication apparatus.

As still another preferred embodiment of the present invention for such object, there is disclosed a data communication system, comprising:

a) a first apparatus for setting plural ID information, to be utilized communication based on a predetermined communication method; and b) a second device executing communication with a device corresponding to a communication method different from the predetermined communication method, utilizing predetermined ID information.

Still another object of the present invention is, in a program for a data communication process contained in a computer readable medium, to cause a device corresponding to the communication method of a standard different for example from the IEEE 1394 standard on which a communication system is based, to be recognized as a component of such communication system. Also it is to cause a function of the device corresponding to the communication method of a standard different from that of the communication system to be recognized as a function provided in the device constituting such communication system.

As a preferred embodiment of the present invention for such object, there is disclosed a program for a data communication process adaptable in an apparatus including a first communication interface corresponding to a first communication method and a second communication interface corresponding to a second communication method different from the first communication method, the program being contained in a medium readable by a computer, comprising a step of:

resetting information relating to the apparatus and adapted to be used by the first communication interface, according to a connection status of the second communication interface.

As another preferred embodiment of the present invention for such object, there is disclosed a program for a data communication process adaptable in a communication system including plural devices corresponding to a common communication method, the program being contained in a medium readable by a computer, comprising steps of:

a) executing communication with a predetermined device based on a communication method different from the common communication method; and b) causing each of the device of the communication system to recognize the predetermined device as one of the device of the communication system.

As still another preferred embodiment of the present invention for such object, there is disclosed a program for a data communication process adaptable in a communication system including plural devices corresponding to a common communication method, the program being contained in a medium readable by a computer, comprising steps of:

a) executing communication with a predetermined device based on a communication method different from the common communication method; and b) causing each of the device constituting the communication system to recognize a function of the predetermined device as a function of the device executing communication based on the different communication method.

Still other objects of the present invention, and the advantages thereof, will become fully apparent from the following detailed description of the embodiments.

BRIEF DESCRIPTION OF THE DRAWINGS

FIG. 14 is a flow chart showing the function of the communication system of the second embodiment.

DESCRIPTION OF THE PREFERRED EMBODIMENTS

The preferred embodiments of the present invention will now be described in detail hereinafter with reference to the accompanying drawings.

[First Embodiment]

Figure 2:
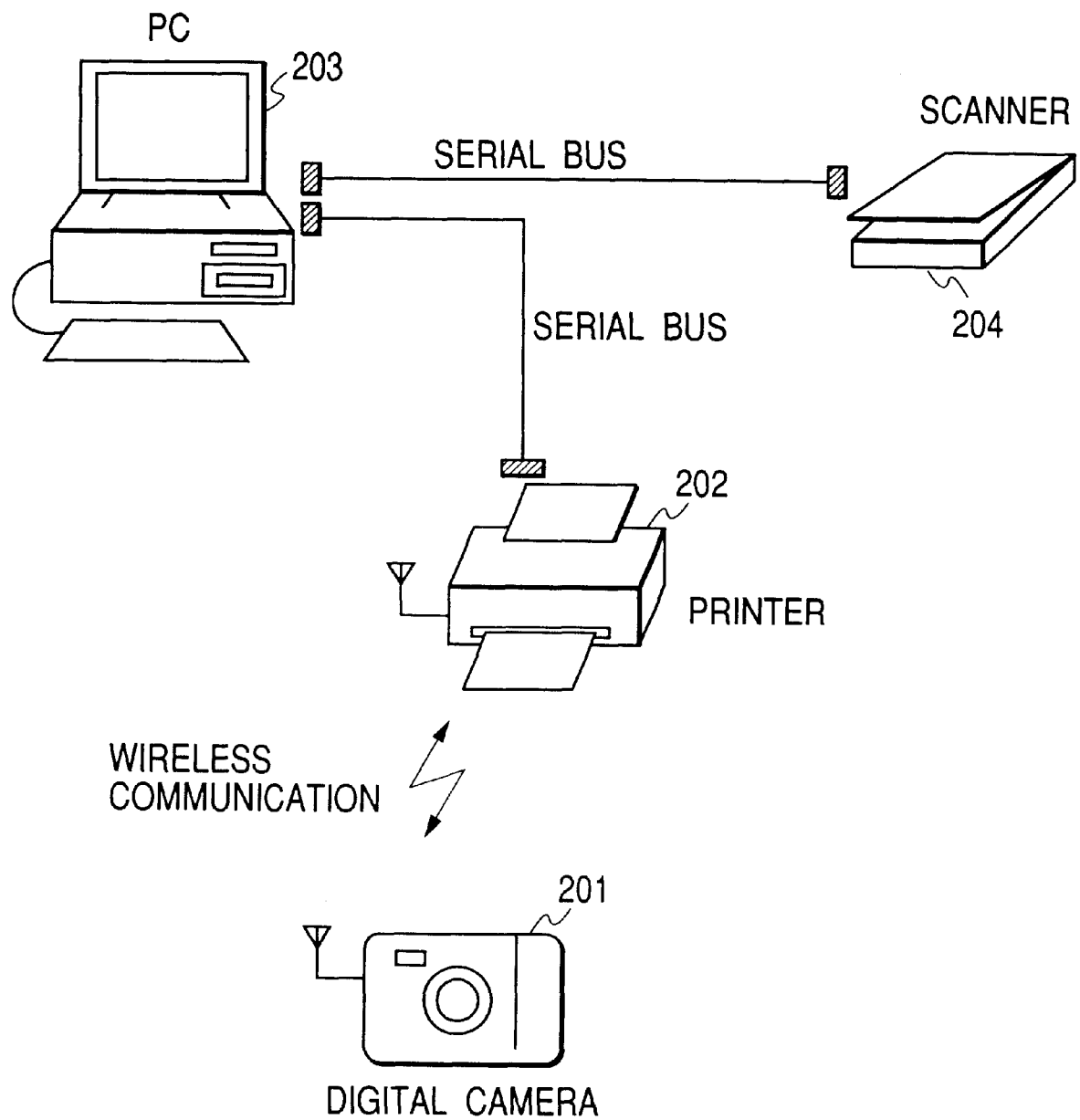
FIG. 2 is a view showing the configuration of a communication system constituting a first embodiment of the present invention.

FIG. 2 is a view showing the configuration of a communication system constituting a first embodiment of the present invention, wherein the communication system includes a printer 202, a personal computer 203 and a scanner 204, and all the device execute communication through communication interfaces based on a communication method of a common standard. Also the digital camera 201 executes communication with the printer 202, through communication interfaces of a standard different from that of the communication system.

Referring to FIG. 2, the digital camera 201 is a portable device provided with a communication interface for wireless communication. The printer 202 is provided with a communication interface capable of wireless communication with the digital camera 201, and has two functions as a direct printer and as a network printer. The direct printer means an operation status capable of communication with the digital camera 201 only, while the network printer means an operation status capable of communication with the digital camera 201 and the communication system.

The printer 202 is also provided with a communication interface based on the IEEE 1394 standard (hereinafter called 1394 interface). The personal computer (hereinafter also written as PC) 203 is provided with a 1394 interface and is connected with the printer 202 through a communication cable based on the IEEE 1394 standard. Also the scanner 204 is provided with a 1394 interface, and is connected with the PC 203 through a communication cable. Thus the printer 202, the PC 203 and the scanner 204 constitute a communication system based on the IEEE 1394 standard.

In the communication system of the first embodiment, the PC 203 is capable of recording image data read by the scanner 204, and image processing such as editing or working on such image data. The printer 202 is capable, in the function as the direct printer, of printing an image taken by the digital camera 201, and, in the function as the network printer, of printing an image read by the scanner 204 or processed by the PC 203. Also the printer 202 is capable of receiving the image data taken by the digital camera 201 and transferring such image data to the PC 203 through the 1394 interface.

The 1394 interface provided in each device is constituted by a physical layer, a link layer and a bus management unit. In the following there will be explained the function and the processing operations of the 1394 interface.

The 1394 interface can accommodate data transfer rates of 100, 200 and 400 Mbps. The 1394 interface supporting an upper data transfer rate is so constructed as to also support the lower data transfer rates.

The 1394 interface also has a function of receiving data transmitting from a device and repeating such data to another device.

Furthermore, the 1394 interface executes a process called bus resetting, according to an increase or a decrease in the device constituting the communication system and to an on/off operation of the power supply in each device, in the following manner.

Firstly, after an automatic detection of a change in the connection configuration of the communication system, the 1394 interface resets the connection configuration that has been recognized up to this point. Secondly, the 1394 interface determines the mother-daughter relationship of the connected device, and recognizes the new connection configuration as a hierarchic connection relationship. Thirdly, the 1394 interface automatically sets the ID starting from terminal device in the communication system, and transmits the set information of the interface (for example connection relationship with other device, supported data transfer rate, supplied or consumed electric power etc.) to the device present on the communication system. The process explained above is executed by the physical layer equipped in the 1394 interface.

The physical layer of the 1394 interface constantly monitors the change in the bias voltage applied to the communication port, and detects the change in the connection configuration by a change in such voltage. A device that has detected the change in the bias voltage transfers a signal, requesting a bus resetting, to the 1394 interfaces of other device. The above-mentioned bus resetting is started after all the device have finally received the signal requesting the bus resetting. The above-mentioned bus resetting can also be activated, in addition to the activation by the change in the connection configuration, also by a direct request from a device itself to the physical layer.

The physical layer in addition has functions of encoding and decoding of the transmitted and received data by the DS-link method, and of mediation (arbitration) of the bus use right.

The link layer has functions of control of the asynchronous transfer mode and the isochronous transfer mode, generation and detection of a communication packet based on the asynchronous transfer mode and the isochronous transfer mode, generation and detection of an error detection code attached to each communication packet, generation of a cycle start packet for controlling the communication cycle etc. Also the bus management unit executes control of the functions of the physical and link layers, management of the band and the channel number in the isochronous transfer mode, management of the communication between an application and the link layer, and also management on the information relating to the connection configuration of the communication system, the data transfer rate and the power supply of each device.

In the first embodiment, the printer 202 is provided with two 1394 interfaces and a wireless interface of a communication method different from the IEEE 1394 standard. One of the two 1394 interfaces is connectable with an external device provided with a 1394 interface, and a node ID automatically assigned by the physical layer constituting such 1394 interface indicates the printer 202 itself. The other 1394 interface is provided inside the printer 202, and node information assigned by the physical layer thereof indicates an external device (digital camera 201) communicating with the above-mentioned wireless interface. In the first embodiment, the wireless interface of the printer 202 supports an infrared communication method based on the IrDA standard. The node ID mentioned above is ID information for identifying each device (node) constituting the communication system based on the IEEE 1394 standard. The node ID consists of a node number and bus number and is automatically set according to a change in the connection configuration of the communication system.

The printer 202 receives, through the wireless interface, image data transmitted from the digital camera 201 based on a data communication method based on the IrDA standard. The printer 202 is so constructed as to transfer the received image data to the 1394 interface and to output such image data to the communication system based on the IEEE 1394 standard. Therefore, the digital camera 201, even executing communication based on a communication method different from that of the PC 203 or the scanner 204, can transfer the image data to these devices. Consequently all the device constituting the communication system of the first embodiment need not be equipped with the wireless interfaces communicable with the digital camera 201. Also in the first embodiment, the digital camera 201 and the printer 202 execute wireless communication. Consequently the digital camera 201 does not lose the mobility of the portable device and can transfer the image data to the various device without cumbersome cable connection.

In the first embodiment, the data communication between the printer 202 and the digital camera 201 is achieved by infrared communication based on the IrDA standard, but such communication method is not restrictive. There may be adopted any communication method, as long as the features of the portable device, such as mobility or compactness are not lost. Also in the first embodiment the portable device executing wireless communication with the printer 202 is constituted by the digital camera 201, but there may be employed another portable device such as a camcorder.

Also in the first embodiment, the configuration shown in FIG. 2 is a mere example, and there may be employed a configuration in which plural device provided with the 1394 interfaces are directly or indirectly connected to the PC 203 or the scanner 204. Also in the first embodiment, the communication system is constituted by the printer 202, the PC 203 and the scanner 204, but there may also be adopted any device capable of constituting a communication system based on the IEEE 1394 standard, for example an external memory such as a hard disk, or a digital device such as a CD player or a DVD player.

Figure 3:
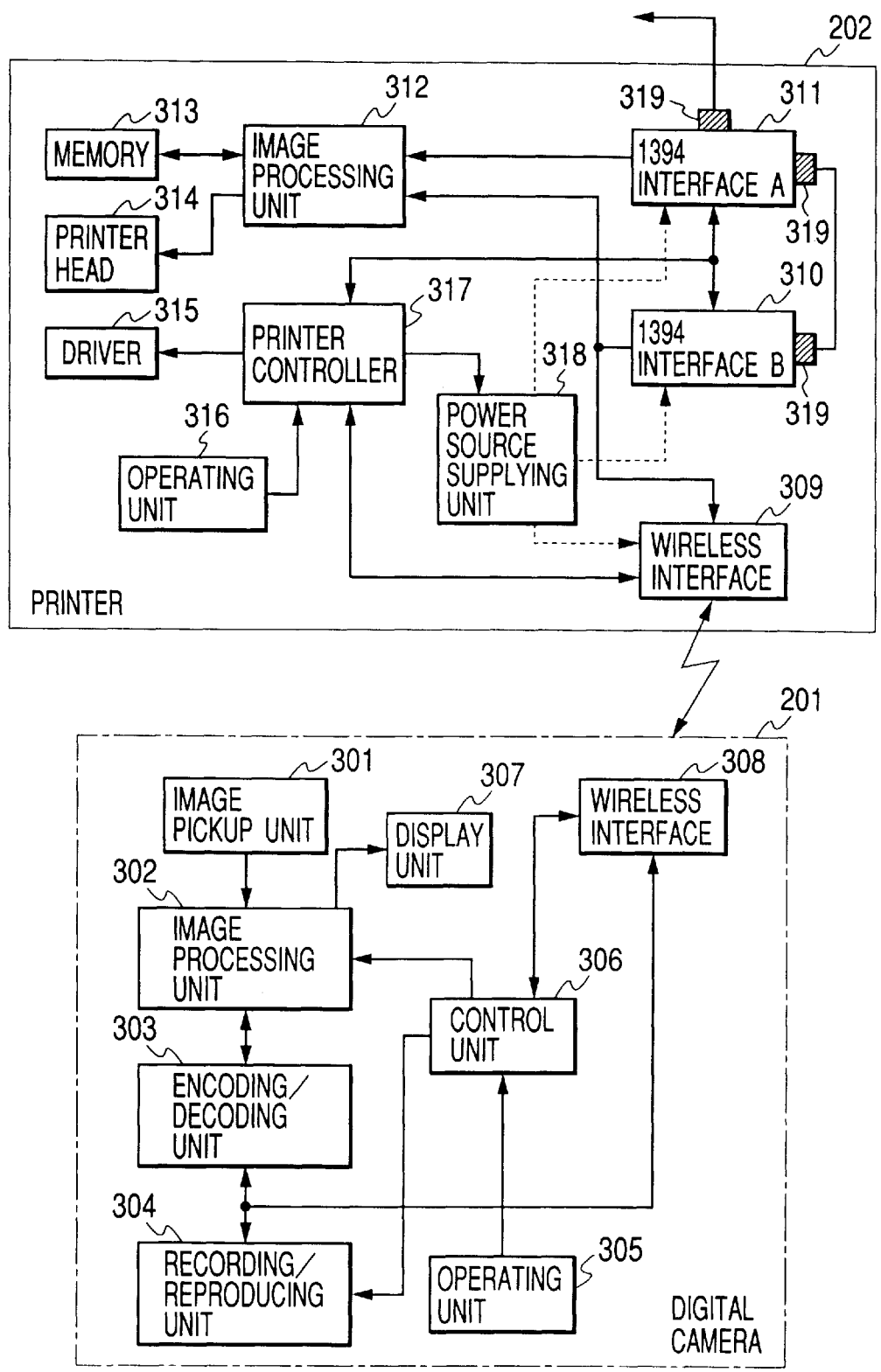
FIG. 3 is a block diagram showing the configuration of a digital camera 201 and a printer 202 in the first embodiment.

FIG. 3 is a block diagram showing the configuration of the digital camera 201 and the printer 202 shown in FIG. 2.

In the digital camera 201 shown in FIG. 3, there are shown an image pickup unit 301; an image processing unit 302 for converting the image outputted from the image pickup unit 301 into image data of a predetermined format; and an encoding/decoding unit 303 for applying predetermined high-efficiency encoding (for example variable encoding after DCT transformation and digitizing) on the image data outputted from the image processing unit 302. The encoding/decoding unit 303 also executes expansion decoding on the compressed image data reproduced from a recording/reproduction unit 304, and sends thus decoded data to the image processing unit 302. There are also provided a recording/reproducing unit 304 for recording or reproducing the compressed encoded image data on or from an unrepresented recording medium; an operation unit 305 for instructing processes in the digital camera 201; a control unit 306 provided with a microcomputer and a memory capable of storing predetermined program codes, and controlling and managing the operations of the various units constituting the digital camera 201; a display unit 307 for displaying the image taken by the image pickup unit 301 by means of an EVF (electronic view finder) or a liquid crystal panel; and a wireless interface 308 for executing wireless communication of the image data taken by the image pickup unit 301, based on the data communication method for example based on the IrDA standard. The digital camera 201 of the present embodiment executes the compression encoding of the image data, utilizing for example the JPEG (joint photographic experts group) method.

Also in the printer 202 shown in FIG. 2, there are provided a wireless interface 309 capable of infrared communication with the digital camera 201 based on the IrDA standard; and a 1394 interface B 310 for converting the output of the wireless interface 309 into a data format based on the IEEE 1394 standard, for output onto the communication system. In the present embodiment, the node ID set by the 1394 interface B indicates the device executing communication with the wireless interface B. Also there is provided a 1394 interface A for printer, connected with the 1394 interface B connected in the printer 202 and connectable with the PC 203 and the scanner 204. In the present embodiment, the node ID set by the 1394 interface A 311 indicates the printer 202 itself. There are further provided an image processing unit 312 for processing the image data supplied from the 1394 interface A 311, the 1394 interface B 310 or the wireless interface 309 into a printable image; a memory 313 employed for forming the image data into a printable image; a printer head 314; a driver 315 for controlling the function of the printer head 314 and a paper feeding mechanism; an operation unit 316 for controlling the operation mode etc. of the printer 202; a printer controller 317 provided with a microcomputer and a memory capable of storing predetermined program codes and adapted to control and manage the functions of the various units constituting the printer 202; and a power supply unit 318 for supplying the 1394 interface A 311, the 1394 interface B 310 and the wireless interface 309 with the necessary electric power.

In the first embodiment, the printer 202 is provided with two 1394 interfaces A 311, B 310 for allowing to set two different node ID's. The 1394 interfaces A 311 and B 310 are mutually connected inside the printer 202 through a communication port 319. In the printer 202 of the first embodiment, the 1394 interface B 310 is so constructed as to convert the data received by the wireless interface 309 into data of a communication method based on the IEEE 1394 standard and to send such data to the 1394 interface A 311. Consequently the node ID assigned by the 1394 interface B 310 indicates the device executing communication through the wireless interface 309, namely the digital camera 201. Also the 1394 interface A 311 can be connected with the 1394 interface equipped in an external device and the node ID assigned by the physical layer indicates the printer 202 itself. In this manner two different node ID's can be set by the two 1394 interfaces provided in the printer 202.

In the following there will be explained the function of the digital printer 201 and the printer 202 shown in FIG. 3.

In the digital camera 201, the image taken by the image pickup unit 301 is converted into a data format suitable for display in the image processing unit 302, and is then displayed on the display unit 307. If the user manipulates the operation unit 305 to set the digital camera 201 at the recording state, the image taken by the image pickup unit 301 is supplied through the image processing unit 302 to the encoding/decoding unit 303. The image data supplied thereto are subjected to compression encoding therein and are recorded in the recording medium (not shown) provided in the recording/reproducing unit 304.

If the user manipulates the operation unit 305 to set the digital camera 201 at the reproducing state, the digital camera 201 reads the desired image from the recording medium provided in the recording/reproducing unit 304. In this operation, the desired image is read by the control of the recording/reproducing unit 304 by the control unit 306 according to the instruction of the user entered through the operation unit 305. The encoding/decoding unit 303 executes an expansion decoding process based on the JPEG system, on the image data reproduced from the unrepresented recording medium. The image data after expansion decoding are converted into a data format suitable for display in the image processing unit 302 and are displayed on the display unit 307.

In case of transferring the desired image data, reproduced from the recording medium provided in the recording/reproducing unit 304, to the printer 202 or a device (for example the PC 203) on the communication system connected with the printer 202, such image data are supplied to the wireless interface 308. The image data, sent by wireless transmission from the digital camera 201, are converted, in the state of JPEG compression encoded data, into a data format based on the IrDA method and are wireless transmitted to the wireless interface 309 of the printer 202.

The image data received by the wireless interface 309 of the printer 202 are supplied, through the image processing unit 312 of the 1394 interface B 310, to the device on the communication system. In this state, the output data from the wireless interface 309 correspond to the data prior to the entry into the wireless interface 308.

In case of transferring the image data, sent by wireless transmission from the digital camera 201, to the device on the communication system through the printer 202 of the above-described configuration, the printer controller 317 so controls the electric power supplied to the 1394 interfaces A 311, B 310 as to ensure the proper function thereof. In this state, the printer 202 functions as the network printer, thus being capable of communication with any device constituting the communication system.

The image data transmitted from the digital camera 201 are supplied from the wireless interface 309 to the 1394 interface B 310, and are converted into a packet of a communication method based on the IEEE 1394 standard, for example the isochronous transfer mode. The isochronous packet outputted from the 1394 interface B 310 is transferred through the 1394 interface A 311 to all the device on the communication system, including the PC 203. In this state the image data from the 1394 interface B 310 are transferred in the isochronous transfer mode, but can also be transferred to a specified device by the asynchronous transfer mode.

Also in case of printing the image data, sent by wireless transmission from the digital camera 201, directly by the printer 202 without passing through the PC 203 (namely in case of the direct printer), the printer controller 317 cuts off the power supply to the 1394 interfaces A 311, B 310 thereby disabling the communication function thereof. In this state the 1394 interface provided in each device on the communication system identifies that the printer 202 is separated from the communication system and automatically recognizes again the configuration of the communication system excluding the printer 202. On the other hand, the printer 202 itself enables the communicating function of the wireless interface 309 only, and executes communication with the device capable of communicating with the wireless interface 309. Consequently the image data transmitted from the digital camera 201 are supplied only to the image processing unit 312 in the printer 202 through the wireless interface 309.

In the first embodiment, the 1394 interface provided in each device detects the addition or deletion of a device to or from the communication system by the change of the bias voltage supplied to the communication cable. Therefore, in case of the function as the direct printer, the printer 202 completely cuts off the electric power supply to the 1394 interfaces A 311, B 310, thereby terminating all the functions relating to the communication of the 1394 interface and terminating the bias voltage supply to the communication cable.

The image processing unit 312 decodes the image data, subjected to the JPEG compression encoding, utilizing a JPEG decoding program file stored in an unrepresented ROM or decoding data transmitted from the digital camera 201 together with the compressed image data. Also the image processing unit 312 converts the decoded image data into a data format, suitable for printing, utilizing the memory 313 and stores the converted data in the memory 313. The image data stored in the memory 313 are supplied to the printer head 216 and printed therein.

Also in case of printing the data outputted from the device constituting the communication system, for example the PC 203, the printing operation is rendered possible by supplying the image processing unit 312 with the data entered from the 1394 interface A 311. In this operation, if the operation status of the digital camera 201 does not require data communication with the device, including the printer 202, on the 1394 serial bus, for example if the digital camera 201 is in the image taking state, the printer controller 317 cuts off the electric power supply to the 1394 interface, thereby disabling the communicating function thereof.

Furthermore, the device constituting the communication system, for example the PC 203, can transfer image data or command data to the digital camera 201. In such case the data transferred from the PC 203 are supplied through the 1394 interfaces A 311, B 310 of the printer 202 to the wireless interface 309, converted into the data format based on the IrDA standard and are wireless transmitted to the digital camera 201.

The printer controller 317 controls the various process units of the printer 202, and, in case the printer 202 is operated as the direct printer or the network printer, the user enters the instruction into the operation unit 305 or 316 of the digital camera 201 or the printer 202. The printer controller 317 controls the electric power supplied from the power supply unit 318 to the 1394 interfaces B 310, A 311 so as to enable the function of either one.

Owing to the above-described structure, the communication system of the first embodiment can recognize the device executing communication by a communication method different from that of the communication system, as a constituting device and can execute the data communication with such device by the communication method same as that of the communication system. Also the communication system of the first embodiment can recognize the digital camera 201 and the printer 202 as separate nodes. Furthermore, the printer 202 of the first embodiment can utilize the printer 202 independently as the network printer or as the direct printer, by controlling the power supply to the two interfaces equipped in the printer 202. In case of function as the direct printer, the printer 202 can execute rapid data communication without being influenced by the communication in the communication system.

Furthermore, in the present embodiment, the JPEG compressed image data are transferred from the digital camera 201 to the printer 202 and decoded therein to achieve an improved transfer efficiency in comparison with the case of transfer of the non-compressed image data. The decoding process corresponding to the JPEG method can be achieved either by a hardware, namely by a JPEG decoding circuit (board) or by a software. For executing such process, the printer 202 itself may be provided therein with a decoder without difficulty in cost and with an advantage of compactization of circuitry. Furthermore, according to input data that do not require JPEG decoding, there may be adopted a configuration that does not activate the decoding circuit or that passes through such data.

Figure 4:
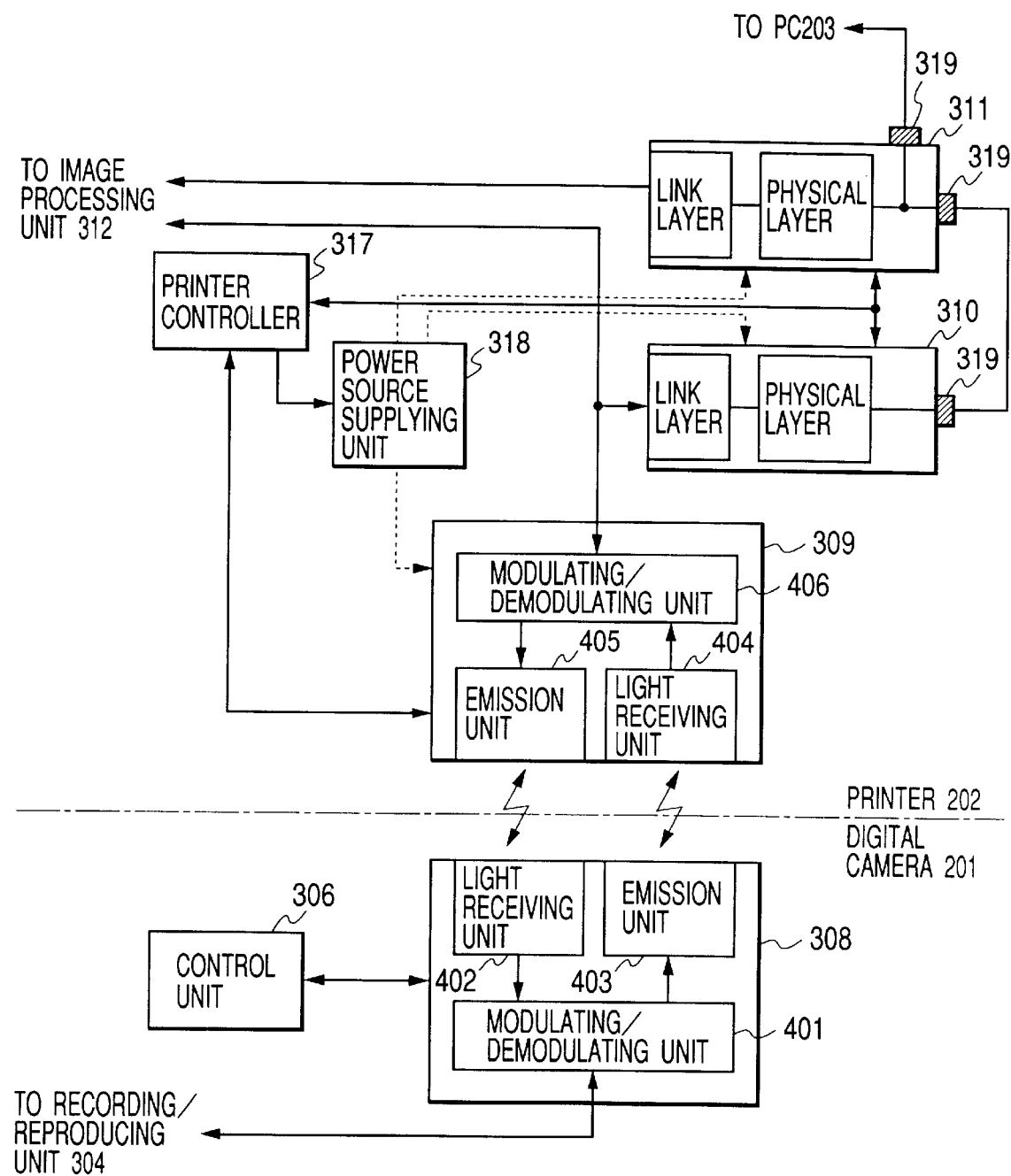
FIGS. 4 and 5 are views showing the structure of a communication packet communicated between the communication interfaces of the present embodiment.

FIG. 4 shows the details of the communication interfaces provided in the digital camera 201 and the printer 202.

Referring to FIG. 4, the wireless interfaces 308, 309 provided in the digital camera 201 and the printer 202 execute infrared communication based on the IrDA standard. The 1394 interfaces A 311, B 310 provided in the printer 202 execute data communication based on the IEEE 1394 standard, with the PC 203 and the scanner 204. In the present embodiment, the 1394 interface B 310 converts the data received by the wireless interface 309 into a communication packet based on the IEEE 1394 standard, so that the digital camera 201 can execute data communication with the device connected to the 1394 interface A 311.

Referring to FIG. 4, the wireless interface 308 of the digital camera 201 includes a modulation/demodulation unit 401, a light receiving unit 402 and a light emitting unit 403. Similarly, the wireless interface 309 of the printer 202 includes a light receiving unit 304, a light emitting unit 405 and a modulation/demodulation unit 406.

Also referring to FIG. 4, each of the 1394 interfaces A 311, B 310 provided in the printer 202 has a function and a configuration based on the IEEE 1394 standard. The 1394 interface is provided at least with a physical layer, a link layer and a bus management unit. The physical layer has functions of bus initialization, encoding/decoding of transmitted/received data, mediation of bus use right etc. Also the link layer has functions of generation/detection of error correction code, generation/detection of packet, cycle control etc. The bus management unit has functions of controlling the link layer and controlling communication with application.

Figure 1:
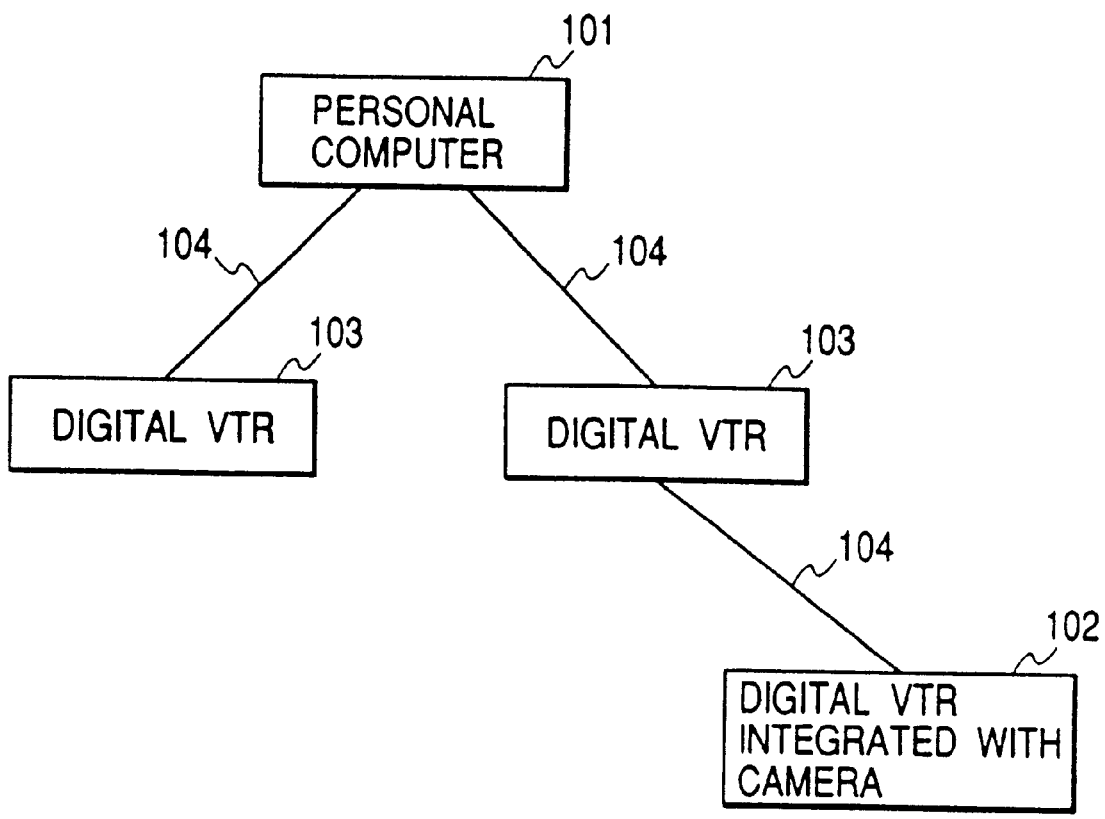
FIG. 1 is a block diagram showing the configuration of a conventional communication system.

In the present embodiment, a port 307 of the 1394 interface B 310 is always connected to a port 308 of the 1394 interface A 311. Also a port 309 thereof is connected with the PC 203 shown in FIG. 1 through the communication cable. As the 1394 interfaces A 311, B 310 are constructed independently, they can be assigned with different node ID's. The printer 202 is given node information of the 1394 interface A 311 for the main body of the printer 202 and another node information of the 1394 interface B 310 for the device connected to the wireless interface 309 (namely the digital camera 201 in the present embodiment). In this manner the PC 203 and the scanner 204 constituting the communication system of the IEEE 1394 standard can recognize the digital camera 201 and the printer 202 as separate device. In the present embodiment, in order to set two node ID's within a single device, the printer 202 is provided therein with two independent 1394 interfaces which are mutually connected inside the printer 202, but it is also possible to construct a backplane environment based on the IEEE 1394 standard by connecting the physical layers of the 1394 interfaces to a backplane bus.

The electric power to the 1394 interfaces A 311, B 310 is supplied from the power supply unit 318. The printer controller 317 controls the electric power supply according to the operation mode of the digital camera 201. For example, in case of printing the image taken by the digital camera 201 by direct communication with the printer 202, the printer controller 317 totally or partly cuts off the electric power supply to the 1394 interfaces A 311, B 310 to disable the function of the physical layers thereof, which therefore become inactive and terminate the supply of the bias voltage to the communication cable. Detecting such change in the bias voltage, the communication system of the IEEE 1394 standard starts the recognition of the new system configuration. Thus the communication system recognizes the digital camera 201 and the system configuration in which the digital camera 201 is separated from the printer 202. In this state the function of the wireless interface 309 alone becomes effective in the printer 202. Consequently the printer 202 functions as the direct printer and executes 1 to 1 communication with the digital camera 201 through the wireless interface 309. Also, in case the printer controller 317 disables the functions of the 1394 interfaces A 311, B 310, the electric power supply thereto may be cut off completely. Otherwise the electric power supply to the physical layers of the 1394 interfaces may be partially cut off to terminate only the supply of the bias voltage.

Also in case of transmitting the taken image from the digital camera 201 to the PC 203 through the printer 202, the printer controller 317 supplies the 1394 interfaces 211, 210 with electric power, thereby realizing the function as the network printer. Thus the printer 202 functions as the network printer, thereby printing the data from the device constituting the communication system, including the digital camera 201.

As explained in the foregoing, the printer controller 317 can change the printer 202 to a network configuration matching the purpose of the user, by controlling the electric power supply to the interfaces 310, 311 according to the operation mode of the digital camera 201. Also by providing the 1394 interface A 311 as the communication interface for the printer 202 and the 1394 interface B 310 and the wireless interface 309 as the communication interfaces for the digital camera 201, as in the present embodiment, even a device not provided with the 1394 interface such as the digital camera 201 can be recognized as a node if it is capable of communication with the printer 202. Also in the present embodiment, the wireless interface 309 is constantly powered by the power supply unit 220.

Figure 5:
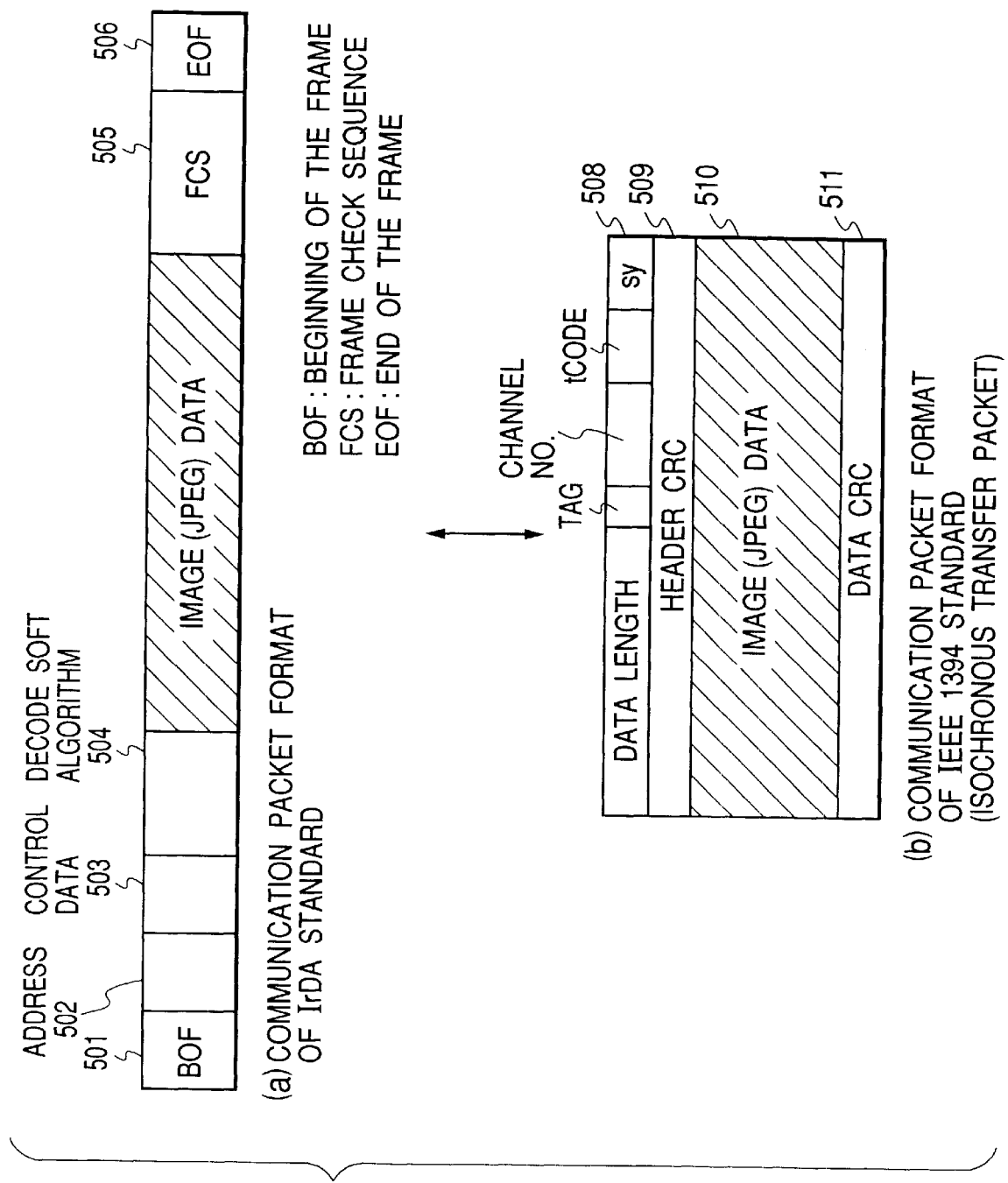

FIG. 5 shows the structure of the communication packet communicated between the communication interfaces of the present embodiment.

In FIG. 5, (a) indicates the structure of a communication packet based on the IrDA standard. The communication packet of the IrDA standard is wireless communicated by a unit, called "frame", consisting of information data of a predetermined amount. At the head of each frame there is added BOF (beginning of frame) 501, and, at the end of each frame there is added EOF (end of frame) 506. Each frame includes a FCS (frame check sequence) field 505 containing error correction data, an address field 502 containing address data, a control field 503 containing control data, and an information field 504 containing information data. In the present embodiment, the information field 504 contains the image data subjected to JPEG compression encoding, and control data relating to such compression encoding. The data indicating the operation mode of the digital camera 201 in the present embodiment are also contained in the information field 504. The communication packet shown in FIG. 5 is generated by the modulation/demodulation unit 301 of the wireless interface 308, and is wireless transmitted through the light emitting unit 303.

The light receiving unit 304 of the printer 202, receiving the communication packet of the above-described structure, sends such packet to the modulation/demodulation unit 406, which judges the content of the data contained in the information field 504 from the data contained in the control field 503. If the data contained in the information field 504 are data indicating the operation mode of the digital camera 201, the printer controller 317 controls the function of the printer 202 according to the content of such data. Also if the data contained in the information field 504 are JPEG encoded image data, such data are demodulated in the modulation/demodulation unit 406 and supplied to the 1394 interface B 310 or the image processing unit 312.

The image data supplied to the 1394 interface B 310 are converted into a communication packet of the isochronous transfer mode based on the IEEE 1394 standard. In FIG. 5, (b) indicates the structure of the communication packet of the isochronous transfer mode, which is composed of a header portion 508, a header portion CRC 509, a data portion 510 and a data portion CRC 511. In the present embodiment, the JPEG compressed image data, contained in the information field 504 of the communication packet based on the IrDA standard, are contained in the data portion 510 of the communication packet based on the IEEE 1394 standard. The communication packet based on the IEEE 1394 standard is transferred, through the port 319 of the 1394 interface B 310, to the desired device on the communication system.

Also in case a device constituting the communication system based on the IEEE 1394 standard (for example PC 203) wishes to communicate with the digital camera 201 through the 1394 interface A 311 of the printer 202, the communication packet transferred from the PC 203 is supplied, through the 1394 interface A 311 and 1394 interface B 310, to the wireless interface 309, which converts the data of the data portion 510, supplied from the 1394 interface B 310, into a communication packet of the IrDA standard contained in the information field 504. The communication packet of the IrDA standard is converted into a signal for infrared communication by the modulation/demodulation unit 406 and is wireless transmitted to the digital camera 201 from the light emitting unit 405. The light receiving unit 402 of the wireless interface 308 of the digital camera 201 receives the transmitted communication packet, which is demodulated by the modulation/demodulation unit 401 and the data contained in the packet is supplied to the recording/reproducing unit 304 or the system controller 306.

Figures 6, 7:
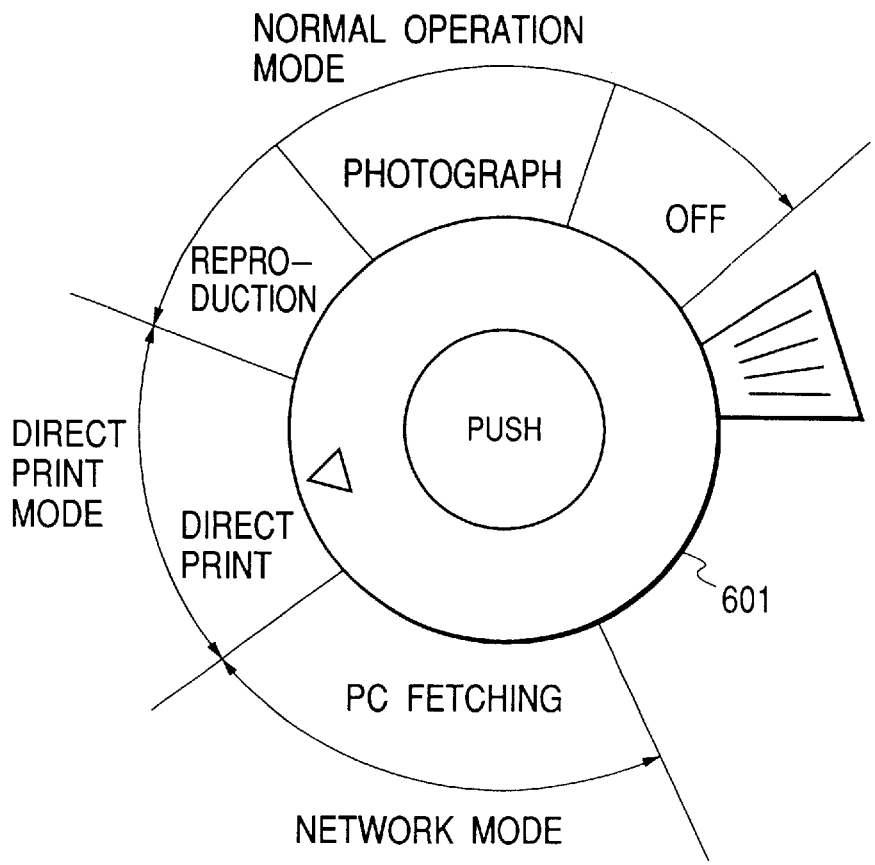
FIG. 6 is a view showing a part of the operation unit 305 provided in the digital camera 201.
FIG. 7 is a table showing operation states of plural communication interfaces provided in the printer 202, corresponding to the operation modes of the digital camera 201.
Figure 8:
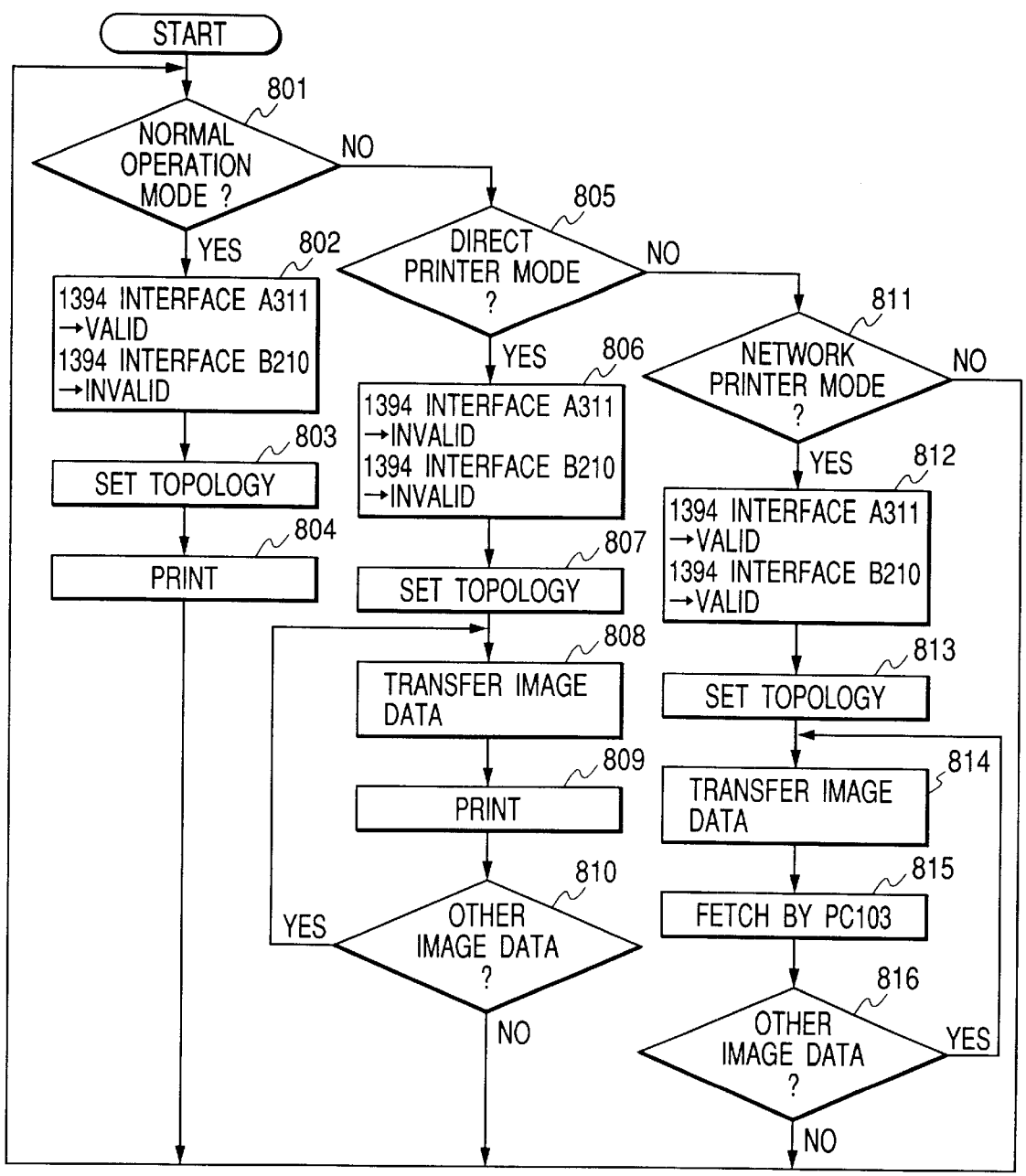
FIG. 8 is a flow chart showing the function of the communication system of the first embodiment.

Now reference is made to FIGS. 6, 7 and 8 for explaining the method for switching the function of the printer 202 of the first embodiment according to the operation mode of the digital camera 201.

FIG. 6 shows a switch 601 for switching plural operation modes of the digital camera 201, constituting a part of the operation unit 305 equipped in the digital camera 201. FIG. 7 is a table showing the operation states of the plural communication interfaces (enabled or disabled state of each communication interface) provided in the printer 202, corresponding to the respective operation mode of the digital camera 201, and FIG. 8 is a flow chart showing the functions of the communication system of the first embodiment.

In FIG. 6, "OFF" indicates a state in which the power supply of the main body of the digital camera 201 is turned off; "photographing" indicates a state in which the image pickup unit 301 of the digital camera 201 is enabled to take the image of an object; and "reproduction" indicates a state of reproducing the image data from the unrepresented recording medium according to the instruction of the user. In the present embodiment these three states are called "normal operation modes". In these modes, the digital camera 201 does not execute communication with the external device.

In case of the "normal operation modes", the digital camera 201 sends control data indicating the "normal operation modes" to the printer 202 (step S801).

According to the control data, the printer 202 terminates the communication with the digital camera 201, also controls the 1394 interfaces A 311, B 310 and constantly monitors the change in the operation mode of the digital camera 201. The printer controller 317 so controls the power supply unit 318 to disable the function of the 1394 interface B 310 of the digital camera 201 and to enable the function of the 1394 interface A 311 (S802). Consequently the printer 202 can communicate with the various device on the communication system, other than the digital camera 201, and can print the output of such various device. In this state, the wireless interface 309 of the printer 202 is constantly powered in order to receive the control data from the digital camera 201. In the present embodiment the printer 202 identifies the "normal operation modes" from the control data transmitted from the digital camera 201, but there may also be adopted a configuration allowing direct entry of control data indicating the "normal operation modes" from the operation unit 316 of the printer 202. It is also possible to provide the printer 202 with timer means for measuring the time after the termination of the communication with the digital camera 201 and to automatically identify the "normal operation modes" after the lapse of a predetermined time.

After the control of the 1394 interfaces A 311, B 310, the device on the communication system executes setting of the topology, excluding the digital camera 201, according to the method based on the IEEE 1394 standard (step S803). Then the printer 202 prints the information data entered through the 1394 interface A 311 (step S804). Thus, when the digital camera 201 functions in the "normal operation modes", the printer 202 functions as a network printer capable of communication solely with the communication system excluding the digital camera 201.

In FIG. 6, "direct printer" indicates an operation of transmitting the image data, designated in the digital camera 201, directly to the printer 202 and printing such image data therein. In this state, the printer 202 does not execute communication with the device on the communication system, for example the PC 203 connected to the 1394 interface A 311. In the present embodiment, such operation mode is called "direct printer mode", in which the printer 202 prints solely the output of the digital camera 201.

In the "direct printer mode", the digital camera 201 transmits control data indicating the "direct printer mode" to the printer 202 (step S805).

The printer 202, for executing data communication with the digital camera 201, controls the power supply unit 318 to disable the function of the 1394 interfaces A 311, B 310 of the printer 202 (step S806). In this manner the printer 202 can communicate solely with the digital camera 201 without being influenced by the communication on the communication system, so that the user can preferentially execute the output from the digital camera 201. Also in the "direct printer mode", the communication system connected to the 1394 interface A 311 automatically recognizes that the digital camera 201 and the printer 202 are both disconnected from the network (step S807). In the present embodiment, the printer 202 is so controlled as to function as the direct printer according to the control data transmitted from the digital camera 201, but the system may also be so constructed as to execute such control according to the input from the operation unit 316.

The image data outputted from the digital camera 201 are supplied, through the wireless interface 308, to the image processing unit 312 of the printer (step S808) and printed therein (step S809). In case of printing other image data of the digital camera 201, the user controls the operation unit 305 of the digital camera 201 for transmitting such image data (step S810).

"PC fetching" in FIG. 6 indicates an operation mode of transferring the image data, designated by the digital camera 201, to the PC 203 of the communication system through the printer 202. In the present embodiment, such operation mode is called "network mode". In such case, the printer 202 functions as the network printer for printing the information data outputted from the device on the communication system, including the digital camera 201.

In case the switch 601 selects the "PC fetching", the digital camera 201 transmits control data indicating such operation mode (step S811).

The printer 202 executes electric power supply to the 1394 interfaces A 311, B 310 to cause the communication system to recognize the presence of the digital camera 201 (step S812). More specifically, the printer controller 317 enables both 1394 interfaces A 311, B 310 whereby node information are assigned to the printer 202 and the digital camera 201 (step S813). Thus the device on the communication system can recognize not only the printer 202 but also the digital camera 201 as the device on the communication system, whereby the digital camera 201 can execute data communication based on the IEEE 1394 standard. In the present embodiment, the printer 202 is so controlled as to function as the network printer in response to the control data transmitted from the digital camera 201, but the system may also be so constructed as to execute such control according to the input from the operation unit 316.

After the communication system of the first embodiment recognizes again the connection configuration of the communication system including the digital camera 201 in the step S813, the printer 202 converts the compressed image data or the control data, wireless transmitted from the digital camera 201, into the communication packet based on the isochronous transfer mode and transfers the packet to the PC 203 (step S814).

The PC 203 receives the communication packet transmitted by the isochronous transfer, memorizes the compressed image data contained therein and executes image processing such as editing (step S815). Also in case of transferring other image data to the PC 203, the user manipulates the operation unit 305 of the digital camera 201 to transmit such image data (step S816). In the present embodiment, there may also be adopted a configuration of selecting and designating the image taken by the digital camera 201 by transmitting a control command for the digital camera 201 from the PC 203. Also the 1394 interface B 310 of the present embodiment converts the image data, transmitted from the digital camera 201, into the communication packet of the isochronous transfer mode, but the image data may also be converted into a communication packet of the asynchronous transfer mode by designating the destination of communication in the digital camera 201. Also in the "network mode" of the present embodiment, the PC 203 is selected as the destination of communication of the digital camera 201, but there may be selected any device on the communication system.

The above-explained configuration allows to control the function of the printer 202 according to the operation mode of the digital camera 201, thereby realizing an optimum network configuration for the digital camera 201 and the printer 202. More specifically, in case the digital camera 201 is in the "normal operation mode" (in the power-off state, in the image pickup state or in the image reproducing state) or in the "network mode", the printer 202 can function as the network printer. Also in case the digital camera 201 is in the "direct printer mode", the printer 202 can function as the direct printer.

The above-described configuration enables to connect the digital camera 201 without the 1394 interface to the communication system based on the IEEE 1394 standard, and to cause each device constituting such communication system to recognize the presence of such digital camera 201. Consequently the digital camera 201 can transmit the taken image data to a specified device or all the device on the communication system, and the digital camera 201 can be controlled from any device on the communication system.

As explained in the foregoing, the first embodiment of the present invention allows a device of a communication standard different from that, for example the IEEE 1394 standard, of the communication system to be recognized as a constituent device of such communication system.

Also according to the first embodiment of the present invention, a device provided with plural communication interfaces is rendered capable of prompt data communication with a specified external device without being influenced by the communication with other device, by disabling communication other than with such specified external device according to the operation state thereof.

[Second Embodiment]

In the first embodiment of the present invention, the printer 202 is provided with two 1394 interfaces A 311, B 310 for setting the node ID's for the printer 202 itself and the device (digital camera 201) capable of communication with the wireless interface 309 of the printer 202. Consequently the communication system of the first embodiment can recognize a communication device based on a different communication standard, as a node.

On the other hand, the second embodiment of the present invention is so constructed, in case communication between the printer 202 and the digital camera 201 is possible, that information relating to the function of the digital camera 201 is stored in the 1394 interface provided in the printer 202. Thus, there is provided a communication system capable of recognizing the printer 202 and the digital camera 201 as a single node, also recognizing the printer 202 as a compound device provided with the function of the digital camera 201. In the second embodiment, the units equivalent in function or in operation to those of the first embodiment are represented by same numbers as in the first embodiment and will not be explained further.

Figure 9:
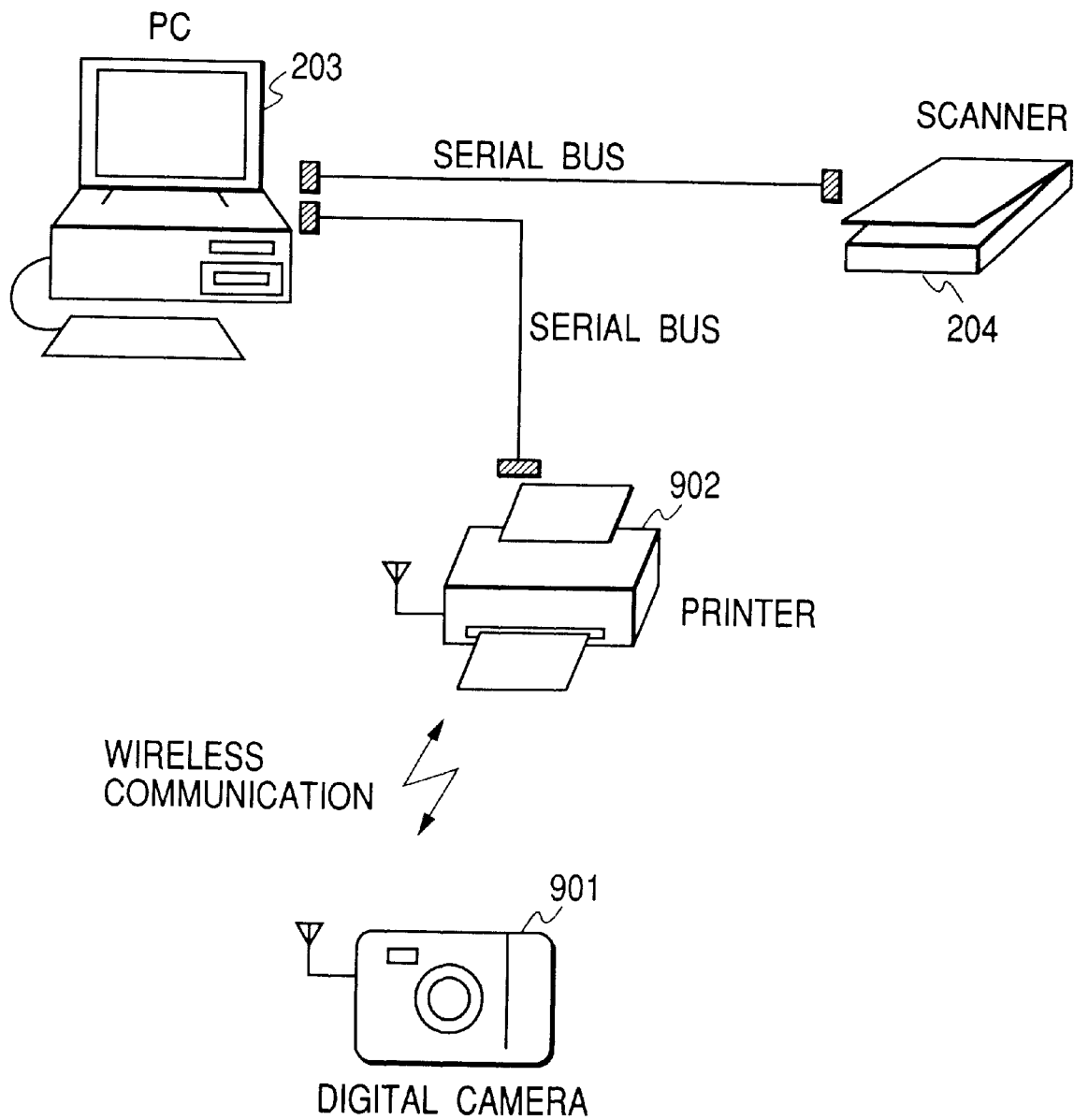
FIG. 9 is a view showing the configuration of a communication system of a second embodiment of the present invention.

FIG. 9 is a view showing the configuration of a communication system constituting the second embodiment of the present invention, wherein the communication system is composed of a printer 902, a personal computer 203 and a scanner 204, which execute communication through communication interfaces corresponding to a common communication standard. A digital camera 901 executes communication, as in the first embodiment, with the printer 902 through communication interfaces based on a standard different from that of the communication system.

Referring to FIG. 9, the digital camera 901 is a portable device provided with a wireless communication interface. The printer 902 is provided with a communication interface capable of wireless communication with the digital camera 901, and is capable of functioning in two manners, namely as a direct printer and as a network printer. The direct printer means an operation status capable of communicating with the digital camera 901 only, and the network printer means an operation status capable of communicating with the digital camera 901 and with the communication system. In the second embodiment, the printer 902, the PC 203 and the scanner 204 are equipped with the 1394 interfaces as in the first embodiment and constitute a communication system based on the IEEE 1394 standard.

In the second embodiment, the printer 902 is provided with a 1394 interface and a wireless interface of a communication standard different from the IEEE 1394 standard. A node ID automatically assigned by the physical layer constituting the 1394 interface indicates the printer 902 itself. Also in the second embodiment, the wireless interface of the printer 902 supports the infrared communication based on the IrDA standard.

Figure 10:
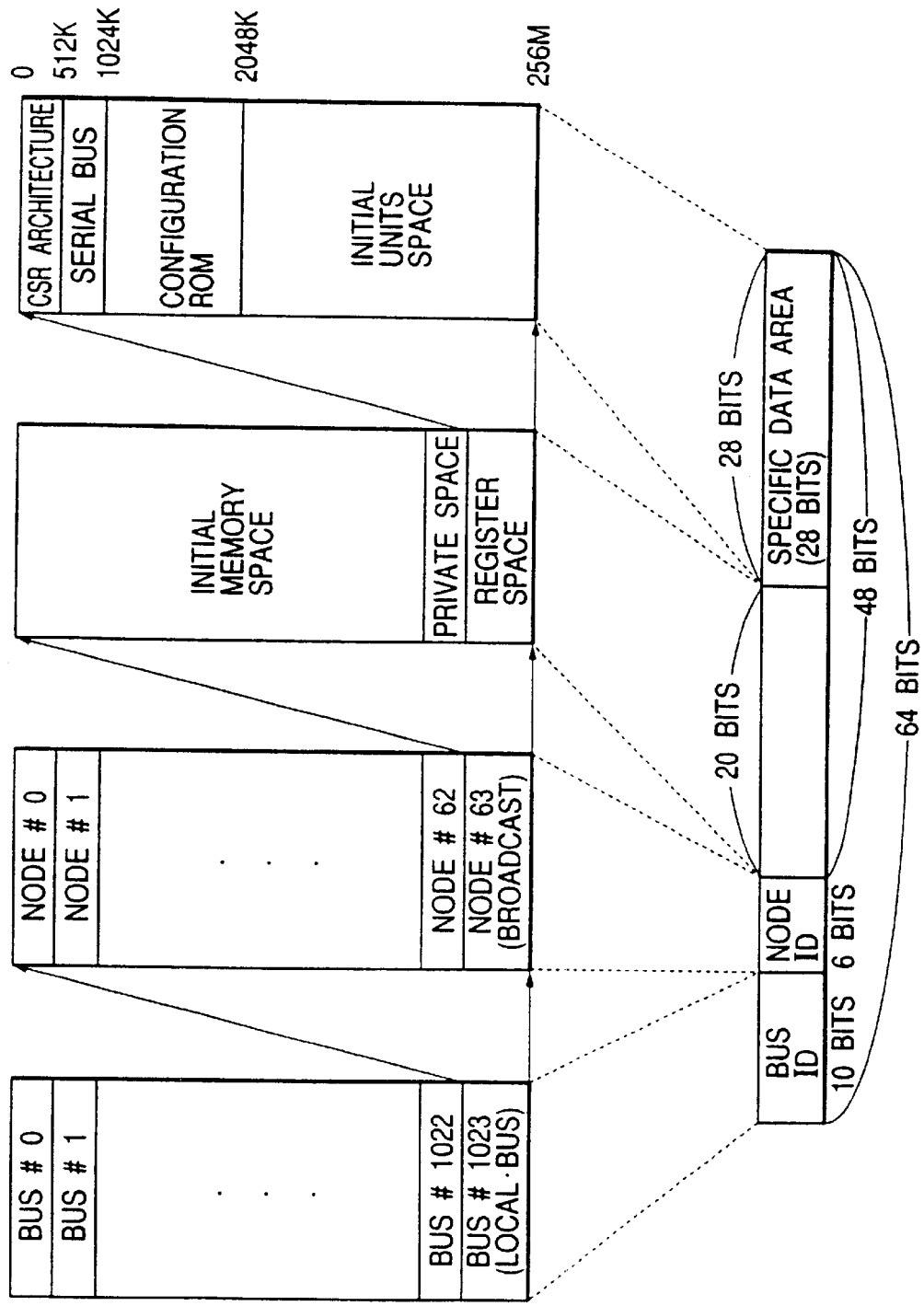
FIG. 10 is a view showing the addressing of a communication system based on the IEEE 1394 standard.

FIG. 10 is a view showing the addressing of the communication system based on the IEEE 1394 standard. In the IEEE 1394 standard, there is defined an address space having a width of 64 bits according to the IEEE 1212 standard. Among the 64-bit address, the initial 10 bits are called bus ID used for the bus identification. Next 6 bits are called node ID, used for identifying various device. The remaining 48 bits constitute an address space, usable by each device. The addressing of the communication system is managed by the bus management unit provided in the 1394 interface.

The 48-bit address space mentioned above is further divided into 20 bits and 28 bits, and the initial 20-bit area represented by "FFFFF$_{16}$" is called a register space, which is utilized in the information exchange between the various device.

An initial area of 512 kbytes in the register space becomes the nucleus of the known CRS (control and status register) architecture. The register space further includes a configuration ROM of 1024 bytes and a unit space for storing information specific to each device.

Figure 11:
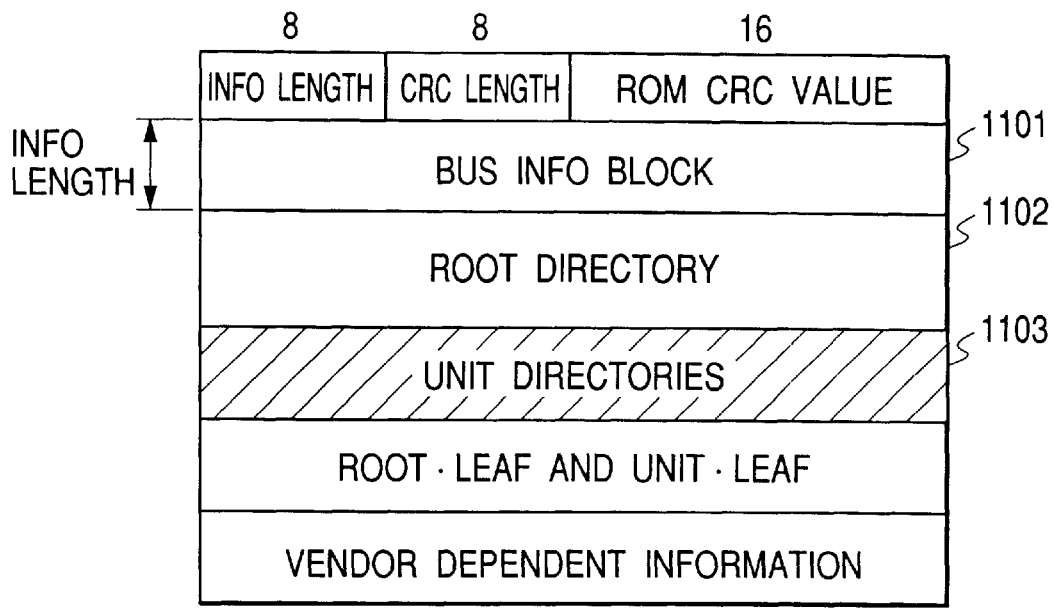
FIG. 11 is a view showing the structure of a configuration ROM provided in the 1394 interface.

The configuration ROM is constructed for example as shown in FIG. 11 for representing the function of each node.

A bus information block 1101 stores a company ID, indicating the supply company of each device. A route directory 1102 stores information specific to each device and the storage position of a next unit directory 1103, which stores control/status information relating to the function of each device, and control/status information on the communication protocol supportable by each device in hierarchic manner. Each device can judge the function provided therein and the supported communication protocol by reading the content of the unit directory 1103.

In case the printer 902 functions as the direct printer in the communication system of the second embodiment, the printer 902 can print the image taken by the digital camera 901. In case the printer 902 functions as the network printer, it can print the image data by the scanner 204 or image edited by the PC 203. Furthermore, in case the printer 902 functions as the network printer, it can received the image data taken by the digital camera 901 and transfer such data to the PC 203 through the 1394 interface.

The printer 902 is so constructed as to execute supply to the 1394 interface after the image data transferred according to the communication method based on the IrDA standard are converted into data of a communication method based on the IEEE 1394 standard. Thus the digital camera 901, even executing communication by a communication standard different from that of the PC 203 or the scanner 204, can transfer the image data thereto. Consequently the wireless interface communicable with the digital camera 901 need not be equipped in all the device constituting the communication system of the second embodiment. Also in the second embodiment, the digital camera 901 and the printer 902 mutually communicate by a wireless method, so that the portable device does not lose the mobility and can transfer the image data to the various device without the trouble of cable connection.

In the second embodiment, the data communication between the printer 902 and the digital camera 901 is executed by the infrared communication based on the IrDA standard, but such form of communication is restrictive. There may be adopted any communication method as long as it does not deteriorate the features of the portable device such as mobility or compactness. Also in the second embodiment, the digital camera 901 has been explained as the portable device executing wireless communication with the printer 902, but such example is not restrictive and there may be employed other portable device such as a digital camcorder.

Also in the second embodiment, the configuration shown in FIG. 9 is merely an example and there may be adopted a configuration in which plural device with 1394 interfaces are directly or indirectly connected to the PC 203 and the scanner 204. Also the communication system of the second embodiment is constituted by the printer 902, the PC 203 and the scanner 204, but there may also be employed other digital device such as an external memory such as a hard disk, a CD player or a DVD player, as long as it can constitute a communication system based on the IEEE 1394 standard.

Figure 12:
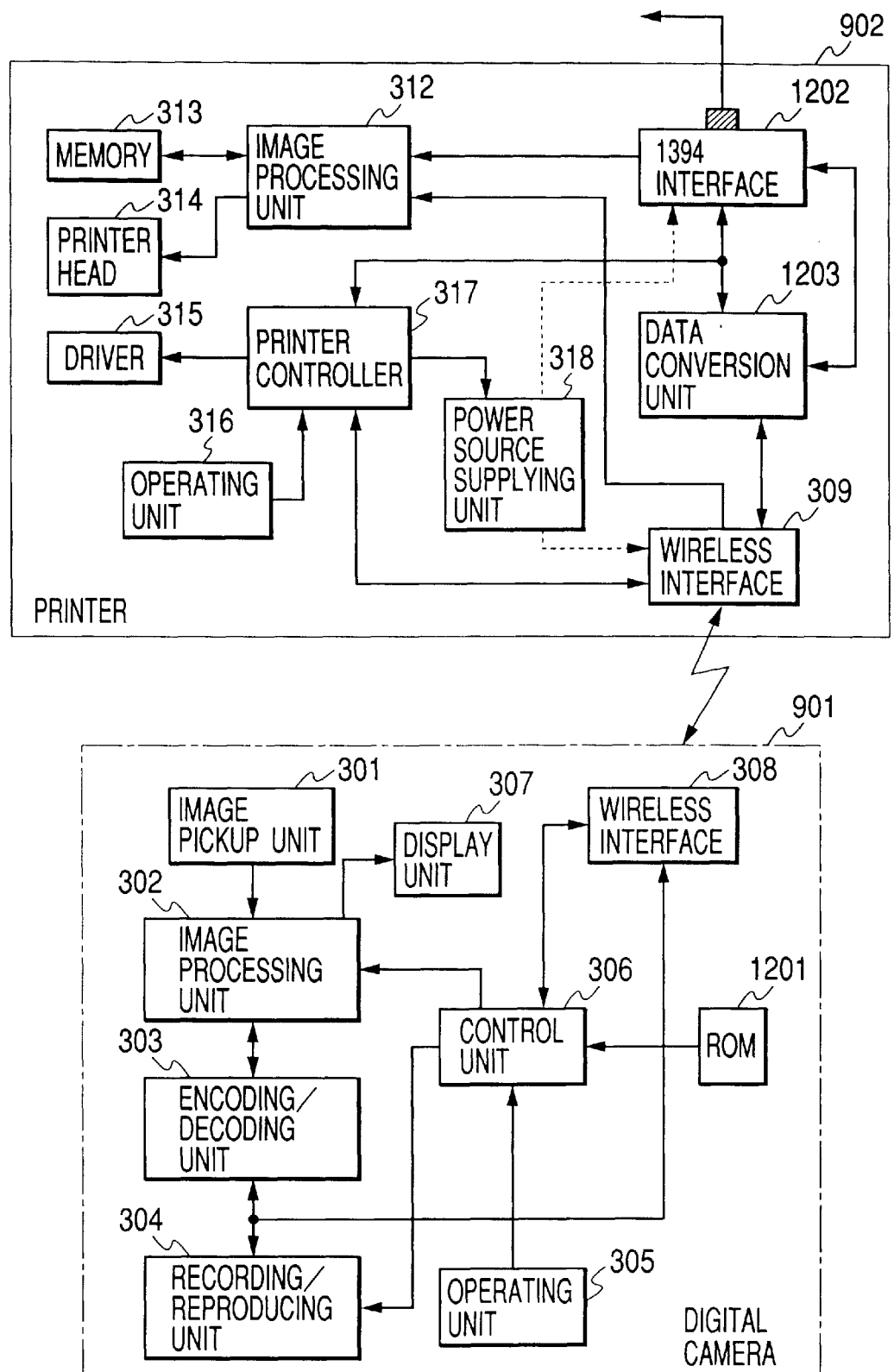
FIG. 12 is a block diagram showing the configuration of a digital camera 901 and a printer 902 in the second embodiment.

FIG. 12 is a block diagram showing the structure of the digital camera 901 and the printer 902 shown in FIG. 9.

Referring to FIG. 12, the digital camera 901 is composed of an image pickup unit 301, an image processing unit 302, an encoding/decoding unit 303, a recording/reproducing unit 304, an operation unit 305, a control unit 306, a display unit 307, a wireless interface 308 and a ROM 1201. The ROM 1201 stores information relating to the function of the digital camera 901. At the start of communication with the printer 902, the control unit 306 reads the information data stored in the ROM 1201 and sends such data to the printer 902 by wireless communication.

Also referring to FIG. 12, the printer 902 is provided with a wireless interface 309, an image processing unit 312, a memory 313, a printer head 314, a driver 315, an operation unit 316, a printer controller 317, a power supply unit 318, a 1394 interface 1202, and a data conversion unit 1203. The data conversion unit 1203 converts the image data, wireless transmitted from the wireless interface 309, into a data format based on the IEEE 1394 standard, for supply to the 1394 interface 1202, which outputs the image data from the digital camera 901 to the communication system constituted together with the PC 203 and the scanner 204. Also a control command (for controlling the function of the digital camera 901) transferred from the communication system to the digital camera 901 is converted from a communication packet based on the IEEE 1394 standard into a communication packet based on the IrDA standard and supplied to the wireless interface 309. In the second embodiment, the printer 902 is provided with a 1394 interface 1202, and a node ID set by such interface indicates the printer 902 itself. In the second embodiment, the communication packet based on the IEEE 1394 standard is constructed as shown in (b) of FIG. 5, as in the first embodiment. Also the communication packet based on the IrDA standard is constructed as shown in (a) of FIG. 5, as explained in the first embodiment.

Figure 13:
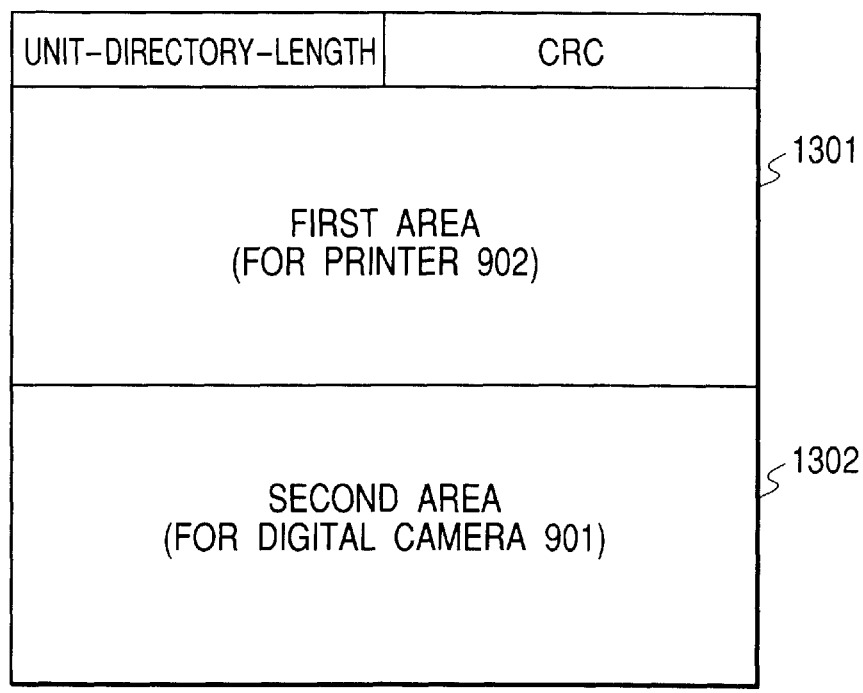
FIG. 13 is a view showing the configuration of a unit directory in the configuration ROM.

Also in the second embodiment, the 1394 interface 1202 is provided therein with a configuration ROM shown in FIG. 11, of which the unit directory 1103 is constructed as shown in FIG. 13.

Referring to FIG. 13, a first area 1301 hierarchically stores the control/status information relating to the function of the printer 902 itself and the control/status information relating to the communication protocol supportable by the printer 902. A second area 1302 is so constructed as to hierarchically store the control/status information relating to the function of the device capable of communication with the wireless interface 309, namely of the digital camera 901, and the control/status information relating to the communication protocol supportable by the digital camera 901.

The printer 902 of the second embodiment supports plural communication protocols for transferring the image data for display, recording or printing by the isochronous transfer mode and the asynchronous transfer mode based on the IEEE 1394 standard. Consequently the printer 902 is capable, employing any one of such communication protocols, of transferring the image data, wireless transmitted from the digital camera 901, to a predetermined device on the communication system. The printer 902 is also capable, employing any one of such communication protocols, of transferring the image data, transmitted from a predetermined device on the communication system, to the digital camera 901. Furthermore, the printer 902 is capable, employing a communication protocol for transferring the image data for printing, of printing the image data transmitted from a predetermined device on the communication system.

In the following there will be explained the function of the digital camera 901 and the printer 902 shown in FIG. 12.

In the digital camera 901, the image taken by the image pickup unit 301 is converted into a data format suitable for display in the image processing unit 302, and is then displayed on the display unit 307. If the user manipulates the operation unit 305 to set the digital camera 901 at the recording state, the image taken by the image pickup unit 301 is supplied through the image processing unit 302 to the encoding/decoding unit 303. The image data supplied thereto are subjected therein to compression encoding based on the JPEG method and are recorded in the recording medium (not shown) provided in the recording/reproducing unit 304.

If the user manipulates the operation unit 305 to set the digital camera 901 at the reproducing state, the digital camera 901 reads the desired image from the recording medium provided in the recording/reproducing unit 304. In this operation, the desired image is read by the control of the recording/reproducing unit 304 by the control unit 306 according to the instruction of the user entered through the operation unit 305. The encoding/decoding unit 303 executes an expansion decoding process based on the JPEG system, on the image data reproduced from the unrepresented recording medium. The image data after expansion decoding are converted into a data format suitable for display in the image processing unit 302 and are displayed on the display unit 307.

Also in case the user initiates the communication with the printer 902 or with a predetermined device on the communication system by manipulating the control unit 305, the digital camera 901 sends, by wireless transmission, information relating to the function of the digital camera 901 to the printer 902. The function information which is wireless transmitted from the digital camera 901 is received by the wireless interface 309 and is supplied to the printer controller 317. The printer controller 317 converts the function information of the digital camera 901 into data based on the IEEE 1394 standard and stores such data in the second area 1302 of the configuration ROM provided in the 1394 interface 1202. After such storage of the function information of the digital camera 901 in the second area 1302, the printer controller 317 requests, to the 1394 interface 1202, execution of bus resetting. The 1394 interface 1202 outputs a signal, indicating the start of bus resetting, to the communication system, and executes ID setting for the device constituting the communication system and rerecognition of the connection configuration. After the bus resetting, the device on the communication system can judge the function of the printer 902 and the supported communication protocol by reading the information stored in the first and second areas 1301, 1302 of the unit directory 1103 of the printer 902. In this manner the communication system can recognize the digital camera 901 and the printer 902 as a single device, or the printer 902 itself as a compound device having the function of the digital camera.

Thereafter the digital camera 901 can transfer the reproduced desired image data to the printer 902 or a device (for example the PC 203) on the communication system. The image data, supplied from the recording/reproducing unit 304 to the wireless interface 308 are converted, in the state of JPEG compression encoded data, int a data format based on the IrDA method and are wireless transmitted to the wireless interface 309 of the printer 902.

In case of transferring the image data, sent by wireless transmission from the digital camera 901, to the device on the communication system through the printer 902, the printer controller 317 so controls the electric power supplied to the 1394 interface 1202 as to ensure the proper function thereof. In this state, the printer 902 functions as the network printer, thus being capable of communication with any device constituting the communication system, utilizing a predetermined communication protocol. Also the device on the communication system can communicate with the device connected to the wireless interface 309, utilizing the predetermined communication protocol.

The image data transmitted from the digital camera 901 are supplied from the wireless interface 309 to the 1394 interface 1202, and are converted into a packet of a communication method based on the IEEE 1394 standard, for example the isochronous transfer mode. The isochronous packet outputted from the 1394 interface 1202 is transferred to all the device on the communication system. In this state the image data from the 1394 interface 1202 are transferred in the isochronous transfer mode, but can also be transferred to a specified device by the asynchronous transfer mode.

Also in case of printing the image data, sent by wireless transmission from the digital camera 901, directly by the printer 902 without passing through the PC 203 (namely in case of direct printing), the printer controller 317 cuts off the power supply to the 1394 interfaces 1202 thereby disabling the communicating function thereof. In this state the 1394 interface provided in each device on the communication system identifies that the printer 902 is separated from the communication system and automatically recognizes again the configuration of the communication system excluding the printer 902. On the other hand, the printer 902 itself enables the communicating function of the wireless interface 309 only, and executes communication with the device capable of communicating with the wireless interface 309. Consequently the image data transmitted from the digital camera 901 are supplied only to the image processing unit 312.

Also in the second embodiment, the 1394 interface provided in each device detects the addition or deletion of a device to or from the communication system by the change of the bias voltage supplied to the communication cable. Therefore, in case of the function as the direct printer, the printer 902 completely cuts off the electric power supply to the 1394 interfaces 1202, thereby terminating all the functions relating to the communication of the 1394 interface 1202 and terminating the bias voltage supply to the communication cable.

The image processing unit 312 decodes the JPEG compression encoded image data, utilizing a JPEG decoding program file stored in an unrepresented ROM or decoding data transmitted from the digital camera 901 together with the compressed image data. Also the image processing unit 312 converts the decoded image data into a data format, suitable for printing, utilizing the memory 313 and stores the converted data in the memory 313. The image data stored in the memory 313 are supplied to the printer head 216 and printed therein.

Also in case of printing the data outputted from the device constituting the communication system, for example the PC 203 by the printer 902, the printing operation is rendered possible by supplying the image processing unit 312 with the data entered from the 1394 interface 1202.

The function of the direct printer or the network printer is set by the entry of an instruction into the operation unit 305 or 306 of the digital camera 901 or the printer 902.

Owing to the above-described structure, the communication system of the second embodiment can recognize the device executing communication by a communication standard different from that of the communication system, as a constituting device and can execute the data communication with such device by the communication method same as that of the communication system. Also the communication system of the second embodiment can recognize the printer 902 as a compound device provided with the function of the digital camera 901. Furthermore, the printer 902 can utilize the printer 902 independently as the network printer or as the direct printer, by controlling the power supply to the 1394 interface equipped in the printer 902. In case of function as the direct printer, the printer 902 can execute rapid data communication without being influenced by the communication in the communication system.

Furthermore, in the second embodiment, the JPEG compressed image data are transferred from the digital camera 901 to the printer 902 and decoded therein to achieve an improved transfer efficiency in comparison with the case of transfer of the non-compressed image data. The decoding process corresponding to the JPEG method can be achieved either by a hardware, namely by a JPEG decoding circuit (board) or by a software. For executing such process, the printer 902 itself may be provided therein with a decoder without difficulty in cost and with an advantage of compactization of circuitry. Furthermore, in response to input data that do not require JPEG decoding, there may be adopted a configuration that does not activate the decoding circuit or that passes through such data.

Now reference is made to FIG. 14 for explaining the method for switching the function of the printer 902 of the second embodiment according to the operation mode of the digital camera 901. FIG. 14 is a flow chart showing the functions of the communication system of the second embodiment shown in FIG. 9. The digital camera 901 of the second embodiment is provided, as in the first embodiment, with a switch 601 for switching the plural operation modes of the digital camera 901. The switch 601 is constructed as shown in FIG. 6.

In the "normal operation mode", the digital camera 901 does not execute communication with the printer 902 (step S1401). In this state, the printer 902 functions as the network printer, capable of communication solely with the communication system excluding the digital camera 901. The printer 902 enables the function of the 1394 interface 1202 and the wireless interface 309 and constantly monitors the change in the operation mode of the digital camera 901. In the present embodiment the printer 902 identifies the "normal operation mode" from the control data transmitted from the digital camera 901, but there may also be adopted a configuration allowing direct entry of control data indicating the "normal operation mode" from the operation unit 316 of the printer 902. It is also possible to provide the printer 902 with timer means for measuring the time after the termination of the communication with the digital camera 901 and to automatically identify the "normal operation mode" after the lapse of a predetermined time.

In the "direct printer mode", the digital camera 901 transmits control data indicating the "direct printer mode" to the printer 902 (step S1402). The printer 902, for executing data communication with the digital camera 901, controls the power supply unit 318 to disable the function of the 1394 interfaces 1202 of the printer 902 (step S1403).

After the reception of the control data indicating the "direct printer mode", the printer 902 receives the information relating to the function of the digital camera 901 (step S1404). The printer 902 converts the content of the information into control/status information based on the IEEE 1394 standard and stores the converted information in the second area 1302 of the unit directory 1103 (step S1405).

After the storage of the information on the digital camera 901 in the second area 1302, the 1394 interface 1202 requests bus resetting to the communication system, and executes re-recognition of the connection configuration (step S1406), whereby the communication system automatically recognizes that the printer 902 is disconnected from the network.

Thereafter the printer 902 receives the image data which are wireless transmitted from the digital camera 901, and sends such image data to the image processing unit 312 (step S1407), and the printer 902 prints the image data, converted into a printable format by the image processing unit 312 (step S1408). Also in case of printing other image data of the digital camera 901, the user manipulates the operation unit 305 of the digital camera 901 to transmit such image data (step S1409). In this manner the printer 902 can communicate solely with the digital camera 901 without being influenced by the communication on the communication system, so that the user can preferentially execute the output from the digital camera 901. Also the present embodiment executes control in such a manner that the printer 902 functions as the direct printer in response to the control data transmitted from the digital camera 901, but the system may also be so constructed as to execute such control in response to the input from the operation unit 316.

In case the switch 601 selects the "PC fetching", the digital camera 901 transmits control data indicating such operation mode (step S1410). The printer 902 controls the power supply unit 318 to enable the function of the 1394 interface 1202 of the printer 902 in order to execute data communication with the communication system including the digital camera 901 (step S1411).

After the reception of the control data indicating the "network mode", the printer 902 receives information relating to the function of the digital camera (step S1412). The printer 902 converts the content of such function information into control/status information based on the IEEE 1394 standard and stores it in the second area 1302 of the unit directory 1103 (step S1413).

After the storage of the information on the digital camera 901 in the second area 1302, the 1394 interface 1202 requests bus resetting to the communication system, and executes re-recognition of the connection configuration (step S1414), whereby the communication system can recognize the printer 902 as a compound device provided with the function of the digital camera 901.

Also in case of transferring the image data of the digital camera 901 of the second embodiment to the PC 203, the printer 902 receives the compressed image data, sent by wireless transmission from the digital camera 901, then converts the compressed image data into a communication packet of the isochronous transfer mode and transfers it to the PC 203 (steps S1415, S1416).

The PC 203 receives the communication packet transferred by the isochronous transfer mode, memorizes the compressed image data contained in the communication packet and applies thereto image processing such as image editing. Also in case of transferring other image data to the PC 203, the user manipulates the operation unit 305 of the digital camera 901 to transmit such image data (step S1417). In the present embodiment, there may also be adopted a configuration of selecting and designating the image taken by the digital camera 901 by transmitting a control command for the digital camera 901 from the PC 203. Also the 1394 interface 1202 of the present embodiment converts the image data, transmitted from the digital camera 901, into the communication packet of the isochronous transfer mode, but the image data may also converted into a communication packet of the asynchronous transfer mode by designating the destination of communication in the digital camera 901. Also in the "network print mode" of the present embodiment, the PC 203 is selected as the destination of communication, but there may be selected any device on the communication system. Also in the present embodiment, the printer 902 is so controlled as to function as the network printer according to the control data transmitted from the digital camera 901, but such control may also be achieved according to an input from the operation unit 316.

The above-explained configuration allows to control the function of the printer 902 according to the operation mode of the digital camera 901, thereby realizing an optimum network configuration for the digital camera 901 and the printer 902. More specifically, in case the digital camera 901 is in the "normal operation mode" (in the power-off state, in the image pickup state or in the image reproducing state) or in the "network mode", the printer 902 can function as the network printer. Also in case the digital camera 901 is in the "direct printer mode", the printer 902 can function as the direct printer.

The above-described configuration enables to connect the digital camera 901 without the 1394 interface to the communication system based on the IEEE 1394 standard, and to cause such communication system to recognize the printer 902 as a compound device provided with the function of the digital camera 901. Consequently the digital camera 901 can transmit the taken image data to a specified device or all the device on the communication system, and the digital camera 901 can be controlled from any device on the communication system.

As explained in the foregoing, the second embodiment of the present invention allows a device of a communication standard different from that, for example the IEEE 1394 standard, of the communication system to be recognized as a constituent device of such communication system.

Also according to the second embodiment of the present invention, a device provided with plural communication interfaces is rendered capable of prompt data communication with a specified external device without being influenced by the communication with other device, by disabling communication other than with such specified external device according to the operation state thereof.

The present invention may be embodied in other specific forms without departing from the spirit or essential characteristics thereof.

The communication system shown in the first and second embodiments is composed of the communication interfaces based on the IEEE 1394 standard, but such configuration is not restrictive. For example the communication system may be based on the USB (universal serial bus) standard, as long as the system is capable of automatic setting of the ID information of the device constituting the communication system and automatic recognition of the connection configuration thereof as in the IEEE 1394 standard.

Also in the communication system shown in the first and second embodiments, the processes of the constituting device may be realized with a software. For example it is also possible to supply a control unit (including a microcomputer) provided in the system or the apparatus of the foregoing embodiments with a memory medium which records program codes of a software realizing the functions of the foregoing embodiments. In such case the embodiments of the present invention can be attained by a configuration in which the control unit provided in the system or the apparatus of the foregoing embodiments reads the program codes stored in the recording medium and controls the function of such system or apparatus so as to attain the functions of the above-described embodiments.

For example program codes realizing the process and function of the first embodiment shown in FIG. 8 or the second embodiment shown in FIG. 14 are stored in a memory provided in the printer controller 317 shown in FIG. 3 or 12, and the control unit 306 or the printer controller 317 reads such program codes and to operate the process circuits of the printer 202 or 902 shown in FIG. 3 or 12 so as to realize the functions of the respective embodiment.

In such case the program codes themselves read from the memory medium realize the functions of the aforementioned embodiments, and the recording medium containing such program codes constitutes a part of the present invention.

The memory medium for supplying the program codes may be composed, for example, of a floppy disk, a hard disk, an optical disk, a magnetooptical disk, a CD-ROM, a CD-R, a magnetic tape, a non-volatile memory card or a ROM.

The present invention naturally includes a case in which an OS (operating system) or an application software functioning on the control unit controls the functions of the system or the apparatus of the foregoing embodiments according to the instructions of the program codes read from the memory medium, thereby realizing the functions of the foregoing embodiments.

Furthermore, the present invention naturally includes a case in which the program codes read from the memory medium are stored in a memory provided in a function expanding board or a function expanding unit connected to the control unit, and a control unit provided in such function expanding board or unit controls the functions of the system or apparatus of the foregoing embodiments according to the instructions of such program codes, thereby realizing the functions of the foregoing embodiments.

Therefore, the above-mentioned embodiments are merely examples in all respects, and must not be construed to limit the present invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A communication apparatus comprising:
   a) a first digital interface which has a function of resetting a bus;
   b) a second digital interface connectable with an external apparatus, wherein said second digital interface is different from said first digital interface;
   c) a memory that includes a first area and a second area, wherein said first area stores first information relating to a function of said communication apparatus, and said second area stores second information relating to a function of said external apparatus; and
   d) a controller adapted to request said first digital interface to reset said bus if said second information is stored in said second area.

2. A communication apparatus according to claim 1, wherein said second digital interface is a wireless interface.

3. A communication apparatus according to claim 1, wherein said first digital interface conforms to USB standard.

4. A communication apparatus according to claim 1, wherein said first digital interface conforms to IEEE 1394-1995 standard.

5. A communication apparatus according to claim 1, wherein said second digital interface conforms to IrDA standard.

6. A communication apparatus according to claim 1, wherein said communication apparatus is a printer.

7. A communication apparatus according to claim 1, wherein said external apparatus is a digital camera.

8. A communication apparatus according to claim 1, wherein said external apparatus is a digital camcoder.

9. A communication system comprising:

a) a first communication apparatus; and b) a second communication apparatus wherein said first communication apparatus comprising a first digital interface which has a function of resetting a bus;

a second digital interface connectable with said second communication apparatus, wherein said second digital interface is different from said first digital interface;

a memory that includes a first area and a second area, wherein said first area stores first information relating to a function of said first communication apparatus, and said second area stores second information relating to a function of said second communication apparatus; and a controller adapted to request said first digital interface to reset said bus if said second information is stored in said second area.

10. A communication system according to claim 9, wherein said second digital interface is a wireless interface.

11. A communication system according to claim 10, wherein said second digital interface conforms to IrDA standard.

12. A communication system according to claim 9, wherein said first interface conforms to USB standard.

13. A communication system according to claim 9, wherein said first digital interface conforms to IEEE 1394-1995 standard.

14. A communication system according to claim 9, wherein said first communication apparatus is a printer.

15. A communication system according to claim 9, wherein said second communication apparatus is a digital camera.

16. A communication system according to claim 9, wherein said second communication apparatus is a digital camcoder.

* * * * *

UNITED STATES PATENT AND TRADEMARK OFFICE
CERTIFICATE OF CORRECTION

PATENT NO.    : 6,529,522 B1
DATED         : March 4, 2003
INVENTOR(S)   : Masamichi Ito It is certified that error appears in the above-identified patent and that said Letters Patent is hereby corrected as shown below:

Column 4,
Line 58, "includes" should read -- including --; and
Lines 64 and 65, "apparatus" should read -- apparatuses --.

Column 5,
Line 8, "the device" should read -- the devices --.

Column 18,
Lines 51 and 60, "device." should read -- devices. --.

Column 19,
Line 17, "received" should read -- receive --; and
Line 55, "device" should read -- devices --.

Column 21,
Line 38, "rerecognition" should read -- re-recognition --; and
Line 53, "int" should read -- in --.

Signed and Sealed this

Eleventh Day of November, 2003

JAMES E. ROGAN
*Director of the United States Patent and Trademark Office*